US008949562B2

(12) United States Patent
Kawaguchi et al.

(10) Patent No.: US 8,949,562 B2
(45) Date of Patent: Feb. 3, 2015

(54) STORAGE SYSTEM AND METHOD OF CONTROLLING STORAGE SYSTEM

(71) Applicant: Hitachi, Ltd., Tokyo (JP)

(72) Inventors: Tomohiro Kawaguchi, Chigasaki (JP); Hideo Saito, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 167 days.

(21) Appl. No.: 13/695,502

(22) PCT Filed: Oct. 15, 2012

(86) PCT No.: PCT/JP2012/006590
§ 371 (c)(1),
(2) Date: Oct. 31, 2012

(87) PCT Pub. No.: WO2014/061054
PCT Pub. Date: Apr. 24, 2014

(65) Prior Publication Data
US 2014/0108754 A1    Apr. 17, 2014

(51) Int. Cl.
G06F 12/16    (2006.01)
G06F 3/06    (2006.01)

(52) U.S. Cl.
CPC .............. *G06F 3/065* (2013.01); *G06F 3/0604* (2013.01); *G06F 3/0683* (2013.01); *G06F 3/0617* (2013.01); *G06F 3/0664* (2013.01); *G06F 3/0665* (2013.01); *G06F 3/067* (2013.01)
USPC .......................................................... 711/162

(58) Field of Classification Search
None
See application file for complete search history.

(56) References Cited

U.S. PATENT DOCUMENTS

| 2005/0033827 A1 | 2/2005 | Yamagami |
| 2006/0143422 A1* | 6/2006 | Mashima et al. ............. 711/170 |
| 2008/0034005 A1 | 2/2008 | Satoyama et al. |
| 2011/0153905 A1 | 6/2011 | Otani et al. |
| 2012/0047346 A1 | 2/2012 | Kawaguchi |

FOREIGN PATENT DOCUMENTS

| JP | 2011-134296 A | 7/2011 |
| JP | 2012-043407 A | 3/2012 |

* cited by examiner

*Primary Examiner* — Duc Doan
(74) *Attorney, Agent, or Firm* — Volpe and Koenig, P.C.

(57) ABSTRACT

An exemplary storage system according to the invention includes a first physical storage apparatus providing a first real volume and a second physical storage apparatus providing a second real volume to form a copy pair with the first real volume. The first physical storage apparatus provides a first host with a first storage identifier and a first volume identifier for the first host to access the first real volume. The second physical storage apparatus provides a second host with at least a part of a first virtual storage apparatus including a first virtual volume allocated the second real volume. The second physical storage apparatus assigns the first volume identifier to the first virtual volume and the first storage identifier to the first virtual storage apparatus.

15 Claims, 25 Drawing Sheets

Fig. 5

LDEV CONFIGURATION MANAGEMENT TABLE (1201)

| REAL LDEV # (12011) | DISK # (12012) | RAID LEVEL (12013) | REAL LU/PHYSICAL PORT (12014) |
|---|---|---|---|
| 0 | 0,1,2,3 | 10(2D+2D) | 1/3, 2/7 |
| 1 | UNDEFINED | UNDEFINED | UNDEFINED |
| 2 | 8,9,10,11 | 5(3D+1P) | 5/3, 7/7 |
| 3 | 12,13,14,15 | 5(3D+1P) | 1/2, 1/4 |
| 4 | 16,17,18,19,20,21,22,23 | 5(7D+1P) | 2/2, 2/4 |
| 5 | 24,25,26,27,28,29,30,31 | 6(6D+2P) | 3/2, 3/4 |
| 6 | 4,5,6,7 | 10(2D+2D) | 2/3, 2/5 |
| 7 | 72,73,74,75,76,77,78,79 | 6(6D+2P) | 4/3, 4/5 |
| 8 | UNDEFINED | UNDEFINED | 1/9, 1/11 |
| 9 | UNDEFINED | UNDEFINED | UNDEFINED |
| 10 | 48,49,50,51 | 10(2D+2D) | 4/4 |
| ... | ... | ... | ... |

Fig. 6

LU CONFIGURATION MANAGEMENT TABLE (1200)

| REAL LU #/ PHYSICAL PORT # (12001) | APPARATUS # (12002) | REAL LDEV # (12003) |
|---|---|---|
| 0/0 | Self | 13 |
| 1/0 | Self | 14 |
| 2/0 | 3 | 2 |
| 3/0 | UNDEFINED | UNDEFINED |
| 0/1 | Self | 13 |
| 1/1 | Self | 14 |
| 2/1 | 3 | 2 |
| 3/1 | UNDEFINED | UNDEFINED |
| 0/2 | UNDEFINED | UNDEFINED |
| 1/2 | Self | 3 |
| 2/2 | UNDEFINED | UNDEFINED |
| ... | ... | ... |

Fig. 7

VIRTUAL RESOURCE MANAGEMENT TABLE  ~1204

| RESOURCE TYPE ~12041 | VIRTUAL ID ~12042 | RESOURCE ID ~12043 | PHYSICAL STORAGE APPARATUS ~12044 |
|---|---|---|---|
| STORAGE APPARATUS | 10 | 1 | 1,2 |
| LDEV | 7 | 2 | 1,2 |
| LDEV | 10 | 3 | 3,2 |
| LU | 2/7 | 7/7 | 1,2 |
| LU | 3/8 | 5/3 | 1,2 |
| LU | 1/7 | 1/2 | 3,4 |
| LU | 1/8 | 1/4 | 3,4 |
| PORT | 7 | 7 | 1,2 |
| PORT | 8 | 3 | 1,4 |
| ... | ... | ... | ... |

Fig. 8

REMOTE COPY MANAGEMENT TABLE (1206)

| REAL LDEV # (12061) | PARTNER APPARATUS ID (12062) | PARTNER REAL LDEV (12063) | PAIR STATE (12064) | REAL LDEV ATTRIBUTE (12065) |
|---|---|---|---|---|
| 0 | N/A | N/A | N/A | N/A |
| 1 | N/A | N/A | N/A | N/A |
| 2 | 2 | 5 | PAIR | PVOL |
| 3 | 2 | 7 | PAIR | PVOL |
| 4 | N/A | N/A | N/A | N/A |
| 5 | N/A | N/A | N/A | N/A |
| 6 | N/A | N/A | N/A | N/A |
| 7 | N/A | N/A | N/A | N/A |
| 8 | N/A | N/A | N/A | N/A |
| 9 | N/A | N/A | N/A | N/A |
| 10 | 3 | 5 | PAIR | SVOL |
| ... | ... | ... | ... | ... |

STORAGE SYSTEM AND METHOD OF CONTROLLING STORAGE SYSTEM

TECHNICAL FIELD

This invention relates to a storage system and a method of controlling the storage system.

BACKGROUND ART

As a background art of this technical field, there have been known remote copy that manifolds data to hold it among a plurality of storage apparatuses located at a plurality of sites in case of a disaster such as an earthquake or a fire, and operation of storage apparatuses utilizing this feature (for example, refer to PTL1, US 2005/0033827 A)

The remote copy is categorized into synchronous remote copy and asynchronous remote copy. In the synchronous remote copy, a storage apparatus transfers data to a copy destination storage apparatus in synchronous with a write command from a host computer. In the asynchronous remote copy, a storage apparatus transfers data to a copy destination storage apparatus after responding to a write command from a host computer. The aforementioned US 2005/0033827 A is categorized as the latter.

To use either one of the remote copy functions, different host computers connect to storage apparatuses placed at separate sites (primary site and secondary site), as described in the aforementioned US 2005/0033827 A. Upon occurrence of a disaster at the primary site, operations of both of the host computers and the storage apparatuses are switched to the secondary site. This operation minimizes data loss and suspension of operations even if a site suffers from a disaster.

In the meanwhile, not against a disaster that affects the overall site as described above but against a failure in a host computer at a site, there is a known technique to protect data and prevent suspension of operations. This technique is called clustering, in which a plurality of host computers share the same volume in the same storage apparatus. If one of a plurality (assuming N+1) of host computers develops a failure, one of the remaining 1 to N host computers takes over the operations performed by the failed host computer to minimize the suspension of operations.

The reason why the host computers share the same volume in the same storage apparatus is, when a failure occurs to a host computer, to allow another host computer which takes over the operations to use data generated or altered by the host computer before the failure occurs.

In typical, a storage apparatus in such a system employs a redundant array of independent disks (RAID) configuration within the apparatus to protect data, independently from the host computers. Also, because of increase in data volume, an environment including a plurality of storage apparatuses at a site has been common in recent years. A larger scale of storage system requires more complex management; accordingly, it is expected that storage systems implementing storage virtualization as disclosed in PTL 2, US 2008/0034005 A will prevail.

CITATION LIST

Patent Literature

PTL 1: US 2005/0033827 A
PTL 2: US 2008/0034005 A

SUMMARY OF INVENTION

Technical Problem

The clustering system requires, to perform the above-described control, a plurality of host computers to be connected to the same storage volume in configuring a cluster. On the other hand, in the remote copy system, different host computers are connected to volumes in different storage apparatuses at different sites and one of the host computers takes over the operations of the other computer in the case of a disaster.

Although the functions of the host computers in the both systems are similar, the clustering system needs to connect the host computers to the same volume, but the remote copy system needs to build up a system including host computers and storage apparatuses with well grasp of the configurations of remote copy pairs of storage apparatuses and volumes and additionally, the switching relationship between host computers at different sites. In this way, the remote copy system is more complex to cause a burden to an administrative user. Also, it is difficult to automate building such a system.

Solution to Problem

An aspect of this invention is a storage system including a first physical storage apparatus providing a first real volume and a second physical storage apparatus providing a second real volume to form a copy pair with the first real volume. The first physical storage apparatus provides a first host with a first storage identifier and a first volume identifier for the first host to access the first real volume. The second physical storage apparatus provides a second host with at least a part of a first virtual storage apparatus including a first virtual volume allocated the second real volume. The second physical storage apparatus assigns the first volume identifier to the first virtual volume and the first storage identifier to the first virtual storage apparatus. The second physical storage apparatus provides the second host with the first storage identifier and the first volume identifier for the second host to access the second real volume via the first virtual volume.

Advantageous Effects of Invention

An aspect of this invention achieves switching of host computers effectively for users.

BRIEF DESCRIPTION OF DRAWINGS

FIG. 5 illustrates an exemplary configuration of an LDEV configuration management table in Example 1.

FIG. 6 illustrates an exemplary configuration of an LU configuration management table in Example 1.

FIG. 7 illustrates an exemplary configuration of a virtual resource management table in Example 1.

FIG. 8 illustrates an exemplary configuration of a remote copy management table in Example 1.

DESCRIPTION OF EMBODIMENTS

Figure 1:
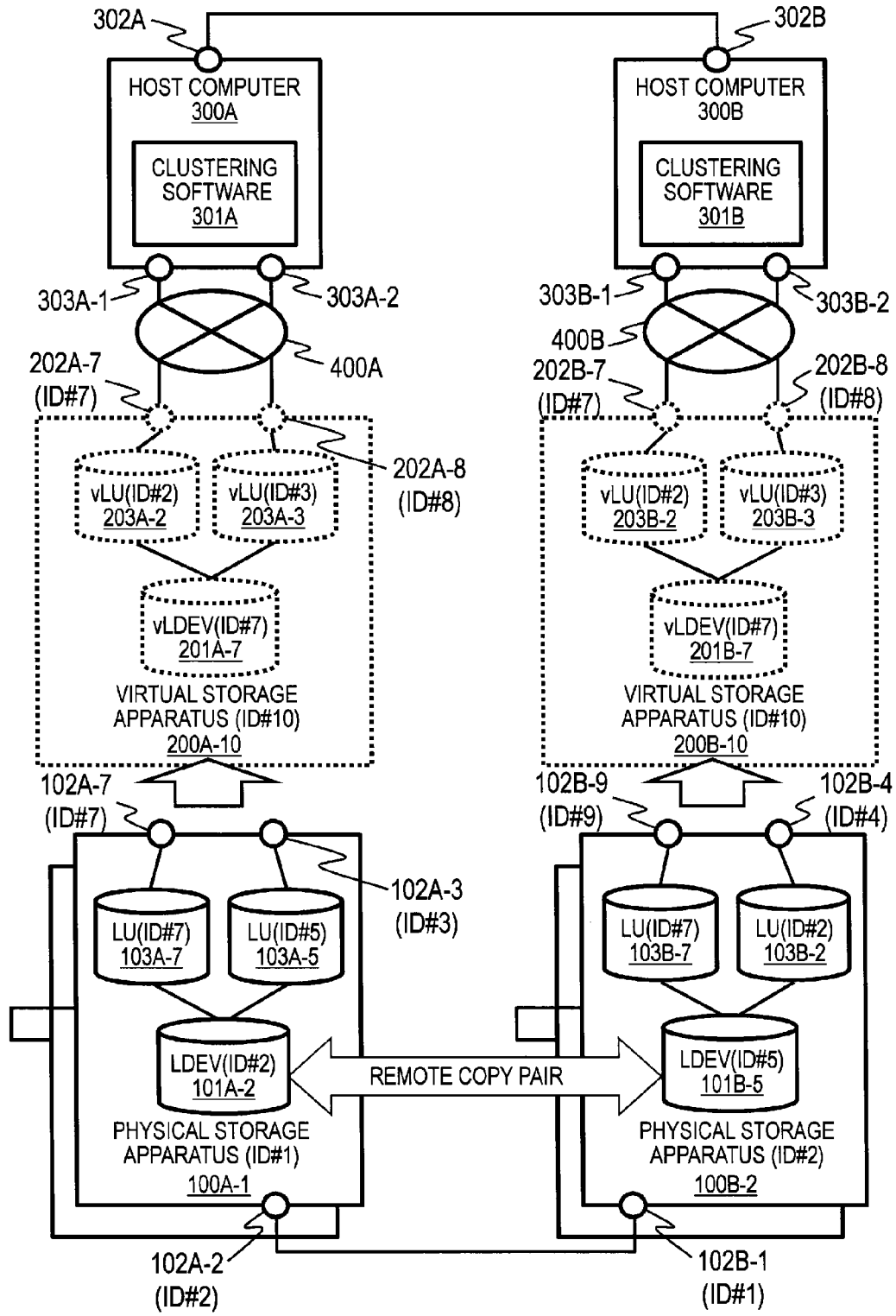
FIG. 1 schematically illustrates a configuration of a virtual storage apparatus that conceals remote copy configuration from host computers in Example 1.

Hereinafter, embodiments of this invention will be described with reference to the accompanying drawings. It should be noted that the embodiments are merely examples to realize this invention and are not to limit the technical scope of this invention.

The embodiments perform concealment by pretending real volumes having a remote copy relationship in different physical (real) storage apparatuses to be the same volume for host computers. They also allow implementation of a clustering function for host computers in the remote copy configuration, in the same way as in the case of a failure in a host computer. Specifically, the embodiments make the host computers recognize the logical units (LUs) which are mounted by storage apparatuses and host computers in real volumes having a remote copy relationship between physical storage apparatuses as the same ones, so that a conventional clustering configuration can be applied in a remote copy environment.

For example, the embodiments make host computers recognize ports connected from the host computers, LUs mounted by the host computers, LDEVs, which are real storage areas allocated for the LUs, in the real volumes having a remote copy relationship between physical storage apparatuses as the same ones.

Example 1

This example deploys one or more physical storage apparatuses and provides a host with a virtual storage apparatus from the one or more physical storage apparatuses at each of two sites. At each site, the host using the virtual storage apparatus is communicably connected to one of the physical storage apparatuses. In acquisition of configuration information of the storage apparatuses to use, the host is informed of the configuration of the virtual storage apparatus from the communicably connected physical storage apparatus.

Specifically, in acquisition of the identifier of a storage apparatus used by the host, the physical storage apparatus informs (provides) the host of (with) the identifier of the virtual storage apparatus instead of the identifier of the physical storage apparatus. When the host acquires a list of IDs of logical units (LUs), the physical storage apparatus informs (provides) the host of (with) a list of IDs of virtual LUs (vLUs) provided by the virtual storage apparatus instead of a list of IDs of LUs (real LUs) inside the physical storage apparatuses.

At each site, one or more physical storage apparatuses provide the host with a virtual storage apparatus. Between the two sites, the virtual storage apparatuses and components in the virtual storage apparatuses used by the two hosts, such as virtual ports (vPORTs), virtual LUs (vLUs), and virtual LDEVs (vLDEVs), have the same IDs.

The physical storage apparatuses at the two sites have a remote copy function. Real LDEVs corresponding to virtual LDEVs for providing virtual LUs at the both sites form a remote copy pair. The host computers at the both sites perform clustering across the sites. The clustered hosts at the both sites mount virtual LUs having the same IDs (virtual IDs) connected to the virtual ports having the same IDs (virtual IDs) in the virtual storage apparatuses having the same ID (virtual ID) to their directories.

Through these operations, the clustered host computers at the both sites recognize that the same volumes (virtual LUs) have been mounted and automatically implement the remote copy function between real LDEVs, which are the substances of volumes accessed by the host computers at the both sites.

In this example, an LDEV is a volume configured by a physical storage apparatus within the apparatus and consists of storage areas of one or more storage drives for storing user data. An LU is a volume allocated to a port connected to a host computer and accessed (recognized) by the host computer. One or more LUs are allocated to an LDEV, if a host computer accesses to the LDEV.

FIG. 1 is a configuration diagram schematically illustrating a general configuration of a computer system in this example. The computer system includes two groups each including a host computer to use a storage apparatus, a physical storage apparatus, and a storage network. In the following description provided by way of example, it is assumed that the two groups are located at different sites.

In the example of FIG. 1, the first group (site A) includes a host computer 300A, a data network (storage network) 400A, and one or more physical storage apparatuses. In the one or more physical storage apparatuses, a physical storage apparatus 100A-1 (ID #1) is specifically indicated with a reference sign. The second group (site B) includes a host computer 300B, a data network 400B, and one or more physical storage apparatuses. In the one or more physical storage apparatuses, a physical storage apparatus 100B-1 (ID #2) is specifically indicated with a reference sign. The plurality of storage apparatuses in the both sites constitute a storage system.

In the following description, one or more physical storage apparatuses 100A represent any one or more of the physical storage apparatuses in the first group. One or more physical storage apparatuses 100B represent any one or more of the physical storage apparatuses in the second group. One or more physical storage apparatuses 100 represent any one or more of the physical storage apparatuses in the computer system.

The data networks 400A and 400B may be storage area networks (SANs); each includes one or more network switches. The data networks 400A and 400B may be any kind. The DAS (Direct Attached Storage) configuration may be employed, where the computer 300A, 300B are connected with the physical storage apparatuses 100A, 100B, respectively, without network switches. This example provides two groups, but the number of groups may be three or more.

In FIG. 1, the host computer 300A can communicate with the physical storage apparatus 100A-1 via host bus adaptor (HBA) ports 303A-1 and 303A-2 in the host computer 300A and physical (real) ports 102A-7 (ID #7) and 102A-3 (ID #3) in the physical storage apparatus 100A-1.

In similar, the host computer 300B can communicate with the physical storage apparatus 100B-2 via HBA ports 303B-1 and 303B-2 in the host computer 300B and physical ports 102B-9 (ID #9) and 102B-4 (ID #4) in the physical storage apparatus 100B-2.

The host computer 300A accesses volumes in the physical storage apparatus 100A-1 via the network 400A. Volume is a term to generalize logical unit and logical device. The host computer 300B accesses volumes in the physical storage apparatus 100B-2 via the network 400B.

The networks 400A and 400B are managed independently and physically separate or logically separate (including physical separation). Accordingly, the host computer 300A does not access any volume in the physical storage apparatus 100B-2 and the host computer 300B does not access any volume in the physical storage apparatus 100A-1. There is no limitation to the physical network configurations of the networks 400A and 400B.

The host computers 300A and 300B belonging to different groups are communicably connected via their respective NIC ports 302A and 302B. These may be connected by an IP network. The host computers 300A and 300B have a clustering function and are included in the same cluster. For example, when a failure occurs in the site A, the operations of the host computer 300A are taken over by the host computer 300B. A third party apparatus may be connected with the host computers 300A and 300B to act as a tie breaker in split brain situation in the automatic takeover. The third party apparatus allows the host computer 300B to distinguish a failure of network disconnection between the host computers 300A and 300B and a failure of the host computer 300A.

The physical storage apparatuses 100A and 100B belonging to different groups are communicably connected via their respective ports connecting to a line (network) other than the data networks 400A and 400B. In the example of FIG. 1, the physical storage apparatuses 100A-1 and 100B-2 are communicably connected with physical ports 102A-2 (ID #2) and 102B-1 (ID #1) and perform remote copy via these ports.

The physical storage apparatuses 100A in the same group are communicably connected via ports connecting to a line (network) other than the data network 400A. In similar, the physical storage apparatuses 100B in the same group are communicably connected via ports connecting to a line (network) other than the network 400B.

The two groups each include a management system (not shown). The management systems and the apparatuses including the physical storage apparatuses in the computer system are connected to a management network and can communicate with one other.

The physical storage apparatuses 100 have IDs unique to the computer system; all the physical storage apparatuses 100A and 100B in the two groups have individual different IDs. Each physical storage apparatus 100 has a plurality of physical ports and configures one or more real LDEVs. The physical ports have IDs unique to the physical storage apparatus to which they belong. The same applies to the real LDEVs. Accordingly, the IDs of the physical ports or the real LDEVs may be duplicated among different physical storage apparatuses.

A physical port provides one or more real LUs (a physical port is associated with one or more real LUs). The real LUs have IDs unique to the physical port to which they belong. Accordingly, the IDs of the real LUs may be duplicated among different physical ports. A real LU is allocated one or more real LDEVs and a real LDEV is allocated one or more real LUs. A real LDEV in a physical storage apparatus may be allocated to a real LU in a different physical storage apparatus in the same group.

In the example of FIG. 1, a real LDEV 101A-2 (ID #2) is configured in the physical storage apparatus 100A-1 and is allocated to two real LUs 103A-7 (ID #7) and 103A-5 (ID #5). The real LU 103A-7 belongs to the physical port 102A-7 and the real LU 103A-5 belongs to the physical port 102A-3. The host computer 300A can read data from and write data to the real LDEV 101A-2 through either one of the real LUs 103A-7 and 103A-5.

Furthermore, a real LDEV 101B-5 (ID #5) is configured in the physical storage apparatus 100B-2 and is allocated to two real LUs 103B-7 (ID #7) and 103B-2 (ID #2). The real LU 103B-7 belongs to the physical port 102B-9 and the real LU 103B-2 belongs to the physical port 102B-4. The host computer 300B can read data from and write data to the real LDEV 101B-5 through either one of the real LUs 103B-7 and 103B-2.

In this system, a remote copy pair is formed of real LDEVs in the physical storage apparatuses 100A and 100B belonging to the different groups. In the example of FIG. 1, the LDEV 101A-2 in the physical storage apparatus 100A-1 forms a remote copy pair with the real LDEV 101B-5 in the physical storage apparatus 100B-2 in the other group. The remote copy function allows the physical storage apparatus 100B to take over the operations from the physical storage apparatus 100A when a failure occurs at the physical storage apparatus 100A. A third party apparatus may be connected with the physical storage apparatuses 100A and 100B to handle the split brain problem in the automatic takeover. The third party apparatus allows the host computer 300B to distinguish a failure of network disconnection between the host physical storage apparatuses 100A and 100B and a failure of the physical storage apparatus 100A. The same third party apparatus may be connected with the host computers and the physical storage apparatuses.

For example, in FIG. 1, the real LDEV 101A-2 is a primary volume (PVOL) and the real LDEV 101B-5 is a secondary volume (SVOL). In the remote copy pair, when a write occurs to the real LDEV 101A-2 configured as a PVOL, the write data is copied to the other LDEV 101B-5 configured as an SVOL, synchronously or asynchronously.

In this computer system, one or more physical storage apparatuses 100 belonging to the same group provide one or more virtual storage apparatuses. In this example, all the virtual storage apparatuses in the same group have different IDs. The virtual storage apparatuses in different groups (different networks), however, can have the same IDs.

In the example described below, a virtual storage apparatus has an ID different from any IDs of the physical storage apparatuses in the same group, but may have the same ID as one of them. In one group, however, all the storage apparatuses recognized by a host computer, inclusive of virtual storage apparatuses and physical storage apparatuses, have different storage apparatus IDs.

Each virtual storage apparatus provides one or more virtual ports and one or more virtual LDEVs. The virtual ports have IDs unique to the virtual storage apparatus to which they belong. The same applies to the virtual LDEVs. Among different virtual storage apparatuses, the IDs of the virtual ports or the IDs of the virtual LDEVs may be duplicated.

Each virtual port provides one or more virtual LUs. The virtual LUs have IDs unique to the virtual port to which they belong. Accordingly, the IDs of the virtual LUs may be duplicated among different virtual ports. In this example, the virtual port and the physical port, the virtual LDEV and the LDEV in a physical storage apparatus (real LDEV), and the virtual LU and the LU in a physical storage apparatus (real LU) each have one-to-one correspondence.

In contrast, the relationship between the virtual storage apparatus and the physical storage apparatus is one-to-many correspondence (many represents one or more). This means that a virtual storage apparatus may be configured from the resources of one or more physical storage apparatuses. Otherwise, a plurality of virtual storage apparatus may be configured from the resources of one physical storage apparatus. The physical storage apparatuses 100A and 100B each configure the IDs of the virtual resources (virtual storage apparatuses, virtual LDEVs, virtual ports, and virtual LUs) so as to satisfy the above-described conditions.

In the example of FIG. 1, the virtual storage apparatus 200A-10 (ID #10) of the first group is configured using the real resources of one or more physical storage apparatuses 100A-1 in the first group. The virtual storage apparatus 200A-10 has virtual ports 202A-7 (ID #7) and 202A-8 (ID #8) to configure a virtual LDEV 201A-7 (ID #7). The virtual LDEV 201A-7 is associated with two virtual LUs 203A-2 (ID #2) and 203A-3 (ID #3). The virtual LUs 203A-2 and 203A-3 belong to the virtual ports 202A-7 and 202A-8, respectively.

The virtual storage apparatus 200B-10 (ID #10) of the second group is configured using the real resources of one or more physical storage apparatuses 100B-2 in the second group. The virtual storage apparatus 200B-10 has virtual ports 202B-7 (ID #7) and 202B-8 (ID #8) to configure a virtual LDEV 201B-7 (ID #7). The virtual LDEV 201B-7 is associated with two virtual LUs 203B-2 (ID #2) and 203B-3 (ID #3). The virtual LUs 203B-2 and 203B-3 belong to the virtual ports 202B-7 and 202B-8, respectively.

If a real LDEV in the physical storage apparatus 100A and a real LDEV in the physical storage apparatus 100B form a remote copy pair, the physical storage apparatuses 100A and 100B assign the same ID to the two virtual LDEVs provided by their respective real LDEVs. Furthermore, they assign the same ID to the two virtual storage apparatuses to which the two virtual LDEVs belong.

The physical storage apparatuses 100A and 100B assign the same IDs to their respective virtual LUs provided by the real LUs on which the two real LDEVs are mounted. The physical storage apparatuses 100A and 100B also assign the same IDs to their respective virtual ports provided by the physical ports to which the foregoing real LUs belong. It should be noted that such ID configuration is available only if the physical storage apparatuses providing two virtual storage apparatuses are connected to different data networks.

In the example of FIG. 1, the real LDEV 101A-2 in the physical storage apparatus 100A-1 and the real LDEV 101B-5 in the physical storage apparatus 100B-2 form a copy pair. The real LDEVs 101A-2 and 101B-5 provide virtual LDEVs 201A-7 and 201B-7, respectively. The IDs of the virtual LDEVs 201A-7 and 201B-7 are the same 7.

The virtual LDEVs 201A-7 and 201B-7 are included in the virtual storage apparatuses 200A-10 and 200B-10, respectively, and the IDs of these virtual storage apparatuses are the same 10.

The real LDEV 101A-2 is mounted on the real LUs 103A-7 and 103A-5. These real LUs 103A-7 and 103A-5 provide virtual LUs 203A-2 and 203A-3, respectively. This means that the virtual LDEV 201A-7 is mounted on the virtual LUs 203A-2 and 203A-3.

The real LDEV 101B-5 is mounted on the real LUs 103B-7 and 103B-2. These real LUs 103B-7 and 103B-2 provide virtual LUs 203B-2 and 203B-3, respectively. This means that the virtual LDEV 201B-7 is mounted on the virtual LUs 203B-2 and 203B-3.

The IDs of the virtual LU 203A-2 and the virtual LU 203B-2 are the same 2. In similar, the IDs of the virtual LU 203A-3 and the virtual LU 203B-3 are the same 3. In this way, the virtual LUs 203A-2 and 203A-3 have the same IDs as the virtual LUs 203B-2 and 203B-3, respectively, as these combinations of virtual LUs correspond the real LDEVs 101A-2 and 101B-5, which form a copy pair.

The physical ports 102A-7 and 102A-3 to which the real LUs 103A-7 and 103A-5 belong provide the virtual ports 202A-7 and 202A-8, respectively. The physical ports 102B-9 and 102B-4 to which the real LUs 103B-7 and 103B-2 belong provide the virtual ports 202B-7 and 202B-8, respectively. The IDs of the virtual ports 202A-7 and 202B-7 are the same 7 and the IDs of the virtual ports 202A-8 and 202B-8 are the same 8.

The virtual LUs 203A-2 and 203B-2 belong to the virtual port 202A-7 and 202B-7, respectively and the virtual LUs 203A-3 and 203B-3 belong to the virtual port 202A-8 and 202B-8, respectively.

The clustering software 301A and 301B in the host computers 300A and 300B transmit information request commands, such as inquiry commands defined by the Small Computer System Interface (SCSI), to the physical storage apparatuses 100A and 100B in their local networks 400A and 400B through the HBA ports and the physical ports of the physical storage apparatuses.

The physical storage apparatuses 100A and 100B reply to the inquiry command by returning a list of virtual LUs belonging to the virtual port associated with the physical port that has received the inquiry command to the host computers 300A and 300B. The physical storage apparatuses 100A and 100B include information, such as virtual IDs, apparatus vendor IDs and apparatus types, on the corresponding virtual port, virtual storage apparatus, and virtual LDEV in the information on the virtual LUs. Additional information such as information on the corresponding real LUs, physical storage apparatus, real LDEV and a physical port may also be sent.

Depending on the design, the physical storage apparatus 100 does not have to return information on the virtual port or virtual LDEV responsive to the inquiry command. If the host computer does not recognize the ID of the virtual port or virtual LDEV, the virtual port or virtual LDEV can be assigned IDs different between the virtual storage apparatuses having the same ID.

Hereinafter, an example that the physical storage apparatus 100A-1 receives an inquiry command issued by the host computer 300A will be described. The same applies to the host computer 300B and the other storage apparatuses 100A and 100B in the networks 400A and 400B.

The clustering software 301A sends an inquiry command to the physical storage apparatus 100A-1 via a physical port connected to an HBA port provided by the host computer 300A, for example, the physical port 102A-7 connected to the HBA port 302A-1.

The physical storage apparatus 100A-1 that has received the command returns a list of IDs of virtual LUs belonging to the virtual port 202A-7 associated with the physical port 102A-7, through which the command has been transmitted, and information on the virtual storage apparatus and the virtual LDEV associated with the virtual LUs. In the example of FIG. 1, the physical storage apparatus 100A-1 returns the ID of the virtual LU 203A-2. The physical storage apparatus 100A-1 also sends the IDs of the virtual port 202A-7, virtual storage apparatus 200A-10, and the virtual LDEV 201A-7 associated with the virtual LU 203A-2 to the host computer 300A.

The clustering software 301A sends inquiry commands to accessible physical ports established in advance. As a result, it acquires information on the virtual LUs associated with the physical ports and the virtual resources associated with the virtual LUs.

As described above, the clustering software 301A that has acquired lists of virtual LUs on the individual virtual ports instructs the clustering software 301B of the other host computer 300B connected with the NIC ports 302A and 302B to mount virtual LUs having the same IDs that belong to the virtual storage apparatuses having the same IDs, use the virtual LDEV having the same ID, and belong to the virtual ports having the same IDs.

The instructed clustering software 301B (the host computer 300B) mounts the virtual LUs that satisfy the foregoing conditions in the same group. In the example of FIG. 1, the virtual storage apparatus 200B-10 has the same ID as the virtual storage apparatus 200A-10 and includes virtual LUs having the same IDs, and a virtual LDEV and virtual ports having the same correspondence relationship with the virtual LUs and the same IDs.

If some failure occurs to either one or both of the host computer 300A and the physical storage apparatus 100A-1 connected from the host computer 300A, the host computer 300B takes over the operations of the host computer 300A and accesses the virtual storage apparatus 200B-10 as described previously.

Although not shown in FIG. 1, the physical storage apparatuses 100A and 100B are equipped with a user interface to receive operation instructions from a user (administrator). The user interface may connect to the management network so that the user can send instructions from the management system to the user interface. The management system can send instructions to the physical storage apparatuses in the same group and transmit communications among the physical storage apparatuses.

Figure 2:
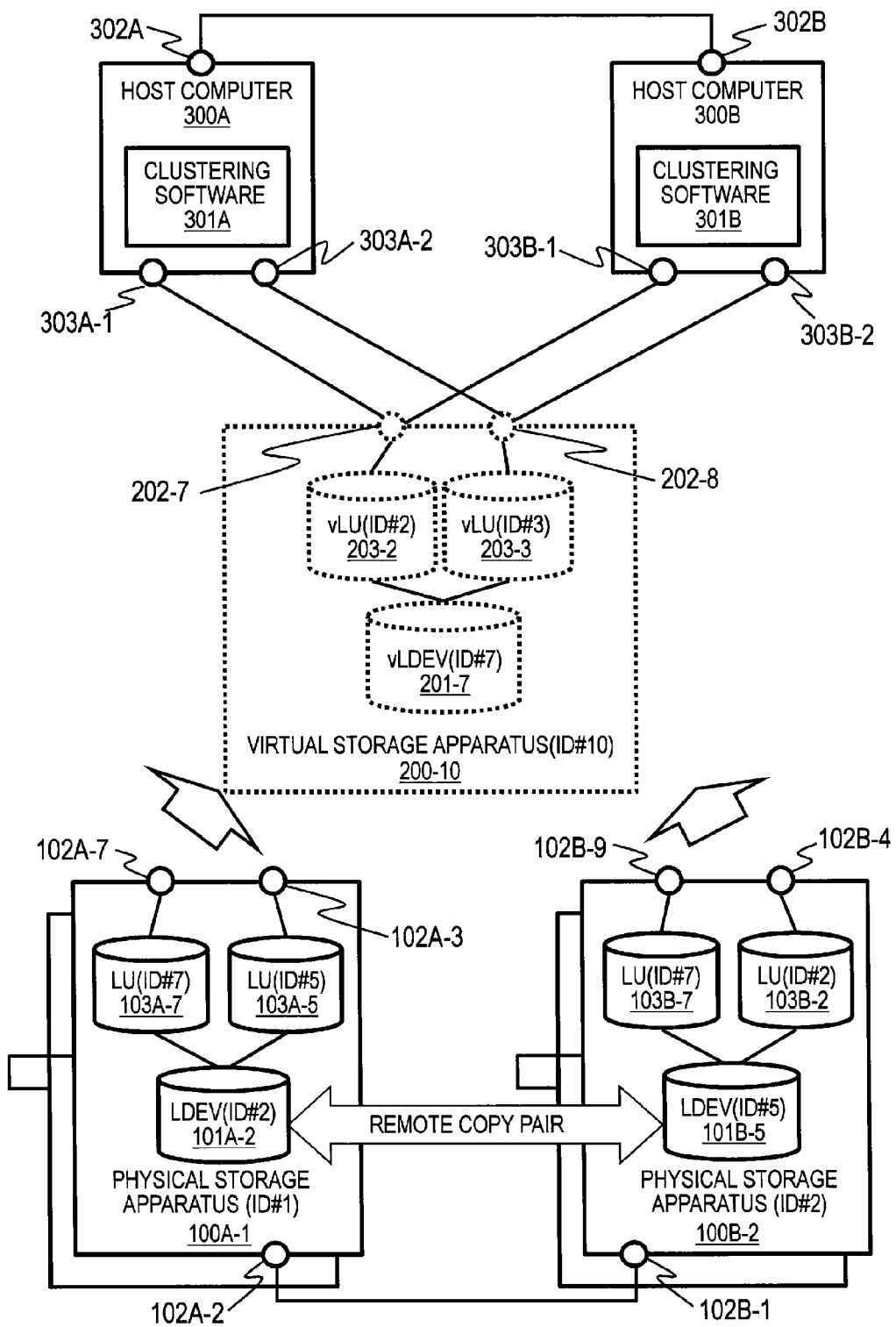
FIG. 2 schematically illustrates connection from the host computers to the virtual storage apparatus in Example 1.

FIG. 2 is a configuration diagram schematically illustrating a general configuration of the computer system in this embodiment, like FIG. 1. These two figures illustrate the same computer system. FIG. 1 is a diagram focused on the method of providing the virtual storage apparatuses 200A-10 and 200B-10 by the physical storage apparatuses 100; in contrast, FIG. 2 is a diagram focused on the method of mounting the virtual storage apparatuses 200A-10 and 200B-10 by the host computers 300A and 300B.

The computer system can provide virtual storage apparatuses having the same configuration and the same ID from a plurality of physical storage apparatuses belonging to different networks or groups. In the example of FIGS. 1 and 2, the virtual storage apparatuses 200A-10 and 200B-10 have the same ID and the same configuration (virtual LUs virtual LDEVs, and virtual ports having the same relations and the same IDs between the virtual storage apparatuses).

The host computers 300A and 300B belonging to different data networks 400A and 400B (different groups) mount virtual LUs that belong to the virtual ports having the same ID, use virtual LDEVs having the same ID, and have the same IDs between the virtual storage apparatuses having the same ID.

The host computers 300A and 300B recognize the virtual storage apparatuses 200A-10 and 200B-10 having the same ID as the same storage apparatus. Furthermore, the host computers 300A and 300B recognize the virtual LUs having the same IDs and the virtual ports and virtual LDEVs associated with these virtual LUs and having the same IDs as the same resources.

FIG. 2 shows a common virtual storage apparatus 200 representing the virtual storage apparatuses 200A-10 and 200B-10 and further shows a common virtual LDEV 201-7, common virtual LUs 203-2 and 203-3, and common virtual ports 202-7 and 202-8.

As described above, the real LDEVs 101A-2 and 101B-5 providing the virtual LDEVs 201A-7 and 201B-7 form a remote copy pair. This computer system performs switching of the processing between the host computers 300A and 300B using the clustering software 301A and 301B in the host computers 300A and 300B. Like the host computer 300A, the host computer 300B accesses virtual LUs having ID #2 and ID #3 to perform the same processing as the host computer 300A.

Figure 3:
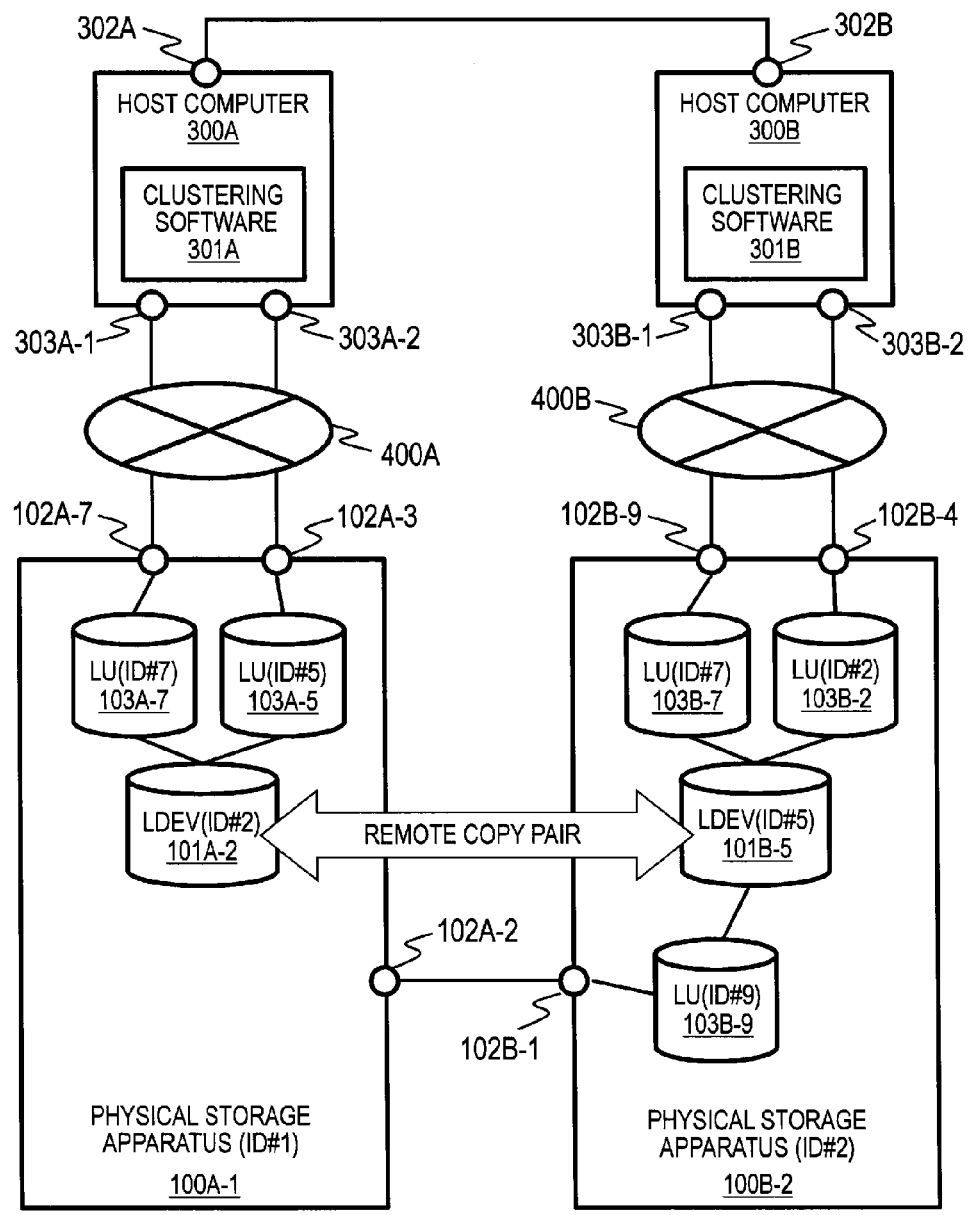
FIG. 3 schematically illustrates connections of the host computers and physical storage apparatuses in Example 1.

FIG. 3 is a configuration diagram schematically illustrating the general configuration of the computer system in this embodiment, like FIGS. 1 and 2. FIGS. 1 and 2 are diagrams focused on the connection of the host computers and the virtual storage apparatuses; in contrast, FIG. 3 is a diagram focused on the connection of the host computers and the physical storage apparatuses.

The host computers 300A and 300B recognize that they themselves connect to the virtual storage apparatuses 200A-10 and 200B-10, respectively; however, they substantially connect to the physical storage apparatuses 100A-1 and 100B-2, respectively. They connect to the physical ports provided by the physical storage apparatuses 100A-1 and 100B-2 to use and connect to the real LDEVs 101A-7 and 101B-5 provided by the physical storage apparatuses 100A-1 and 100B-2 and to mount and connect to the real LUs 103A-7 and 103A-5, 103B-7 and 103B-2 provided by the physical storage apparatuses 100A-1 and 100B-2.

The physical storage apparatuses 100A-1 and 100B-2 sets IDs for virtualization to individual components to provide virtual storage apparatuses 200A-10 and 200B-10.

A real LU 103B-9 is a real LU created from the real LDEV 101B-5 and provided to the physical storage apparatus 100B-2. In a remote copy between the real LDEVs 101A-7 and 101B-5, the physical storage apparatus 100A-1 transfers copy data while specifying the real LU 103B-9 and its address.

Figure 4:
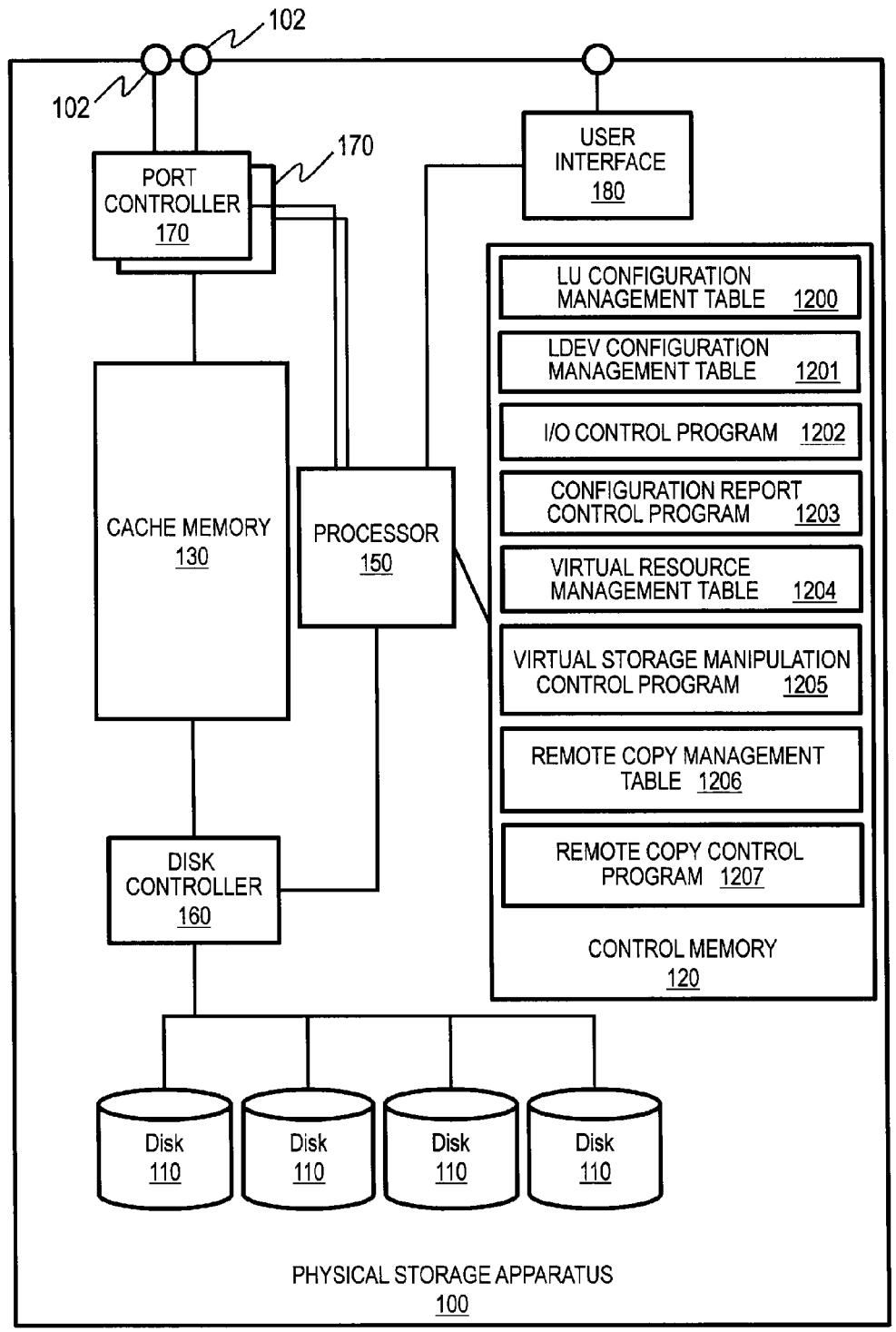
FIG. 4 illustrates an exemplary configuration of a physical storage apparatus in Example 1.

FIG. 4 is a configuration diagram schematically illustrating an exemplary configuration of the storage apparatus 100. All of the physical storage apparatuses 100 in the computer system include software shown in FIG. 4. The physical storage apparatuses 100 in the computer system may have the same or different hardware configurations.

The physical storage apparatus 100 includes a processor 150, a control memory 120, a cache memory 130, a disk controller 160, disks (a storage drive such as a hard disk drive or a solid-state drives) 110, a port controller 170, and physical ports 102. The numbers of these elements in the physical storage apparatus 100 depend on the design.

The disk controller 160 performs control and data transmission/reception for the disks 110. The port controller 170 performs control of the physical port 102 assigned thereto and data transmission/reception with the host computer and other physical storage apparatuses via these physical ports 102.

The disks 110 are connected to the disk controller 160 to be controlled. The physical ports 102 are connected to the port controller 170 to be controlled. The disk controller 160 and the port controller 170 are connected to the processor 150 to be controlled. The disk controller 160 and the port controller 170 are also connected to the cache memory 130 to share or communicate data through the cache memory 130.

The processor 150 is connected to the control memory 120 to control the disk controller 160 and the port controller 170 based on control information and control programs stored in the control memory 120. The processor 150 is connected to a user interface 180 to perform processing responsive to a user request or output required information.

The control memory 120 stores an LU configuration management table 1200, which is management information to manage relations among real LUs, physical ports, and real LDEVs, an LDEV configuration management table 1201, which is management information to configure a RAID with a plurality of disks 110, an I/O control program 1202 for controlling I/O processing on real LDEVs, and a configuration report control program 1203 for outputting information on storage apparatuses, ports, LDEVs, and LUs.

Furthermore, the control memory 120 stores a virtual resource management table 1204, which is management information to implement virtual storage apparatuses, a virtual storage manipulation control program 1205 for creating and altering configurations of the virtual storage apparatuses, a remote copy management table 1206 to manage the configuration of remote copy, and a remote copy control program 1207 for performing remote copy between physical storage apparatuses.

The programs are executed by the processor 150 to perform predetermined processing using the storage apparatuses and communication devices. Therefore, a description in this embodiment made with a subject of a program may be a description with a subject of the processor 150. Alternatively, processing performed by a program is processing performed by the physical storage apparatus on which the program runs. The processor 150 operates as functional parts (means) for realizing the functions executed by the programs. A physical storage apparatus is an apparatus including these functional parts (means). At least some of the programs may be realized by dedicated hardware.

Hereinafter, configurations of the tables stored in the control memory 120 will be described. In the following description, exemplary configurations of tables stored in the physical storage apparatus 100A-1 will be described. The tables include information on components other than the components in the physical storage apparatus 100A-1 illustrated in FIGS. 1 to 3.

In this embodiment, information to be used is described in the forms of tables; however, the information does not need to be expressed in the data structure of table, but may be expressed in the data structures of list, DB, queue, and the like. The information does not depend on the data structure. To describe the substance of information, terms such as identification information, identifier, name, and ID can be used, but they can be replaced with one another.

FIG. 5 is a configuration diagram illustrating an example of the LDEV configuration management table 1201. The LDEV configuration management table 1201 has a column of real LDEV numbers 12011, a column of disk numbers 12012, a column of RAID levels 12013, and a column of real LUs/physical ports 12014.

The LDEV number column 12011 stores IDs of real LDEVs provided by the local physical storage apparatus, the physical storage apparatus 100A-1 in this example. The disk number column 12012 stores a list of IDs of the disks that compose each real LDEV. The RAID level column 12013 stores information on the RAID level and the configuration of the subject real LDEV.

The real LU/physical port column 12014 stores the IDs of the LUs and the physical ports the real LUs belong to provide the subject real LDEV to the external. The real LU/physical port column 12014 may store a plurality of elements. That is to say, a real LU can be created at each of a plurality of physical ports in order to establish multiple paths.

This example describes physical storage apparatuses that directly provide a RAID group for a real LDEV; however, the physical storage apparatuses may provide real LDEVs obtained by dividing a RAID group or integrating RAID groups, or may provide real LDEVs using a thin-provisioning function.

In the case of thin-provisioning, the LDEV configuration management table 1201 should have a column for storing IDs of pools in place of the disk number column 12012 and the RAID level column 12013, and additional tables for managing configuration of the pools and for managing page allocation to real LDEVs may be prepared as disclosed in JP 2006-302258 A.

If the subject real LDEV is not defined, the disk number column 12012, the RAID level column 12013, and the real LU/physical port column 12012 store UNDEFINED. In such a case, the physical storage apparatus performs processing, assuming that the subject real LDEV does not exist.

However, a real LDEV can be defined regardless of non-existence of the substance (storage space) of the subject real LDEV. To define such a real LDEV, the disk number column 12012 and the RAID level column 12013 store UNDEFINED and the real LU/physical port column 12014 stores the configuration of the real LUs and the physical ports. In this case, the subject real LU cannot be accessed, but the host computer can perform processing as if the real LU and the real LDEV existed (for example; the host computer can receive a response to an inquiry command).

FIG. 6 is a configuration diagram illustrating an example of the LU configuration management table 1200. The LU configuration management table 1200 has a column of real LU/port numbers 12001, a column of apparatus numbers 12002, and a column of real LDEV numbers 12013.

The real LU/physical port number column 12001 stores IDs of real LUs managed (provided to hosts) by the local physical storage apparatus (the physical storage apparatus 100A-1 in this example) and physical ports to which the real LUs belong. The apparatus number column 12002 stores a value "Self" or IDs of other physical storage apparatuses. A field containing a value of "Self" means that I/Os to the subject real LU are performed to a real LDEV in the local physical storage apparatus (the physical storage apparatus 100A-1 in this example).

A field containing the ID of a different physical storage apparatus means that I/Os to the subject LU are performed to a real LDEV in the physical storage apparatus having the ID. I/Os to an LDEV in a different physical storage apparatus are performed via a connection among physical storage apparatuses different from the network 400A.

The real LDEV number column 12003 stores the ID of the real LDEV actually accessed in I/Os to the subject real LU (the real LDEV that provides the LU).

FIG. 7 is a configuration diagram illustrating an example of the virtual resource management table 1204. The virtual resource management table 1204 has a column of resource types 12041, a column of virtual IDs 12042, a column of resource IDs 12043, and a column of physical storage apparatuses 12044.

The virtual resource management table 1204 manages virtual resources provided by the real (physical) resources of the physical storage apparatus holding this table 1204 (the physical storage apparatus 100A-1 in this example). If virtual storage apparatuses having the same ID are provided at a plurality of sites, the virtual resource management table 1204 stores information on the other physical storage apparatuses providing the virtual resources having the same IDs (refer to the description of the physical storage apparatus column 12044, which will be provided later).

The resource type column 12041 stores types of virtualized components (resources) or the types of objects to be virtualized, such as LDEV, port, and LU. Since storage apparatuses are virtualized, "storage apparatus" is one of the types to be stored.

The virtual ID column 12042 stores IDs in the virtual storage apparatus assigned to the virtualized components. To a virtual LDEV and a virtual port, IDs unique to the virtual storage apparatus are assigned. To a virtual LU, an ID unique to the virtual port to which the virtual LU belongs is assigned; accordingly, one field stores an ID obtained by combining a virtual LU ID and a virtual port ID.

In this example, a virtual storage apparatus is assigned an ID which is not duplicated with any IDs of the other virtual storage apparatuses in the same network (group) and the physical storage apparatuses in the computer system. In the virtual ID column 12042, virtual IDs are managed in such a manner that neither the IDs of the virtual storage apparatuses nor the IDs of the same type of components in the same virtual storage apparatus will be duplicated.

The resource ID column 12043 stores the IDs in the local storage apparatus of real (physical) components. Real LDEVs and physical ports have IDs unique to the physical storage apparatus. Since a real LU has an ID unique to the physical port, a field stores an ID obtained by combining the ID of the real LU and the ID of the physical port as the identifier of the real LU.

If the physical storage apparatus holding this table (the physical storage apparatus 100A-1 in this example) provides a virtual storage apparatus, the entry of this table stores the ID (in this example, 1) of the physical storage apparatus (in this example, the physical storage apparatus 100A-1) holding this table.

The physical storage apparatus 12044 stores the IDs of the physical storage apparatuses providing the virtualized component. If virtual storage apparatuses having the same ID are provided at a plurality of sites as shown in the configuration of FIG. 2, the IDs of the physical storage apparatuses at the plurality sites are stored in the field of this column.

The physical storage apparatuses 100 communicate information on virtual storage apparatuses (virtual resources) with one another via the data network 400 or the management network. Alternatively, the management system of each group sends information on the virtual resources shared through communications among the management systems to the physical storage apparatuses in this group.

For example, FIG. 1 shows virtual storage apparatuses 200A-10 and 200B-10 having a virtual ID 10. The virtual storage apparatuses are provided by a physical storage apparatus 100A-1 (ID #1) in the first group and a physical storage apparatus 100B-2 (ID #2) in the second group. In FIG. 7, the entry of the virtual storage apparatus having the virtual ID 10 holds 1 and 2 in the field of the physical storage apparatus column 12044.

FIG. 8 is a configuration diagram illustrating an example of the remote copy management table 1206. The remote copy management table 1206 has a column of real LDEV numbers 12061, a column of partner apparatus IDs 12062, a column of partner real LDEVs 12063, a column of pair states 12064, and a column of real LDEV attributes 12065.

The real LDEV number column 12061 stores IDs of real LDEVs (subject real LDEVs). The partner apparatus ID column 12062 stores the IDs of the physical storage apparatuses including the real LDEVs which are paired with the subject real LDEVs. The partner real LDEV column 12063 stores the IDs in the physical storage apparatus of the real LDEVs paired with the subject real LDEVs.

The pair state column 12064 stores either PAIR or PSUS if the subject real LDEV is paired with another. The real LDEV attribute column 12065 stores either PVOL (copy source volume) or SVOL (copy destination volume) if the subject real LDEV is paired with another.

If the value in the pair state column 12064 is PAIR and the value in the real LDEV attribute column 12065 is PVOL, when a write occurs to the subject LDEV of the entry, the write data is transferred to the real LDEV of the pair partner. On the other hand, if the value in the pair state column 12064 is PAIR and the value in the real LDEV attribute column 12065 is SVOL, the data written to the real LDEV of the pair partner is automatically mirrored to the subject real LDEV of the entry.

If the value in the pair state column 12064 is PSUS, data copy is not performed between the real LDEVs in the entry in both cases where the value in the real LDEV attribute column 12065 is PVOL and SVOL. In the case of a failure, the physical storage apparatus to be switched to (the physical storage apparatus providing a real LDEV configured as an SVOL) switches the pair state from PAIR into PSUS and the host computer and the physical storage apparatus take over the operations using the real LDEV configured as an SVOL at the copy destination.

An entry storing the value N/A in the partner apparatus ID column 12062, the partner real LDEV column 12063, and the real LDEV attribute column 12065 means that the subject real LDEV does not have a remote copy pair partner.

Hereinafter, exemplary processing of the programs shown in FIG. 4 will be described. In the following description, processing of the programs will be explained while referring to the processing of the programs in the physical storage apparatus 100A-1 or 100B-2 as appropriate. As described previously, the programs can perform the same processing in each physical storage apparatus in the computer system.

In the following description, a physical port 102, a virtual port 202, a real LU 103, a virtual LU 203, a real LDEV 101, and a virtual LDEV 201 represent any one of the physical ports, any one of the virtual ports, any one of the LUs, any one of the virtual LUs, any one of the real LDEVs, and any one of the virtual LDEVs, respectively.

Figure 9:
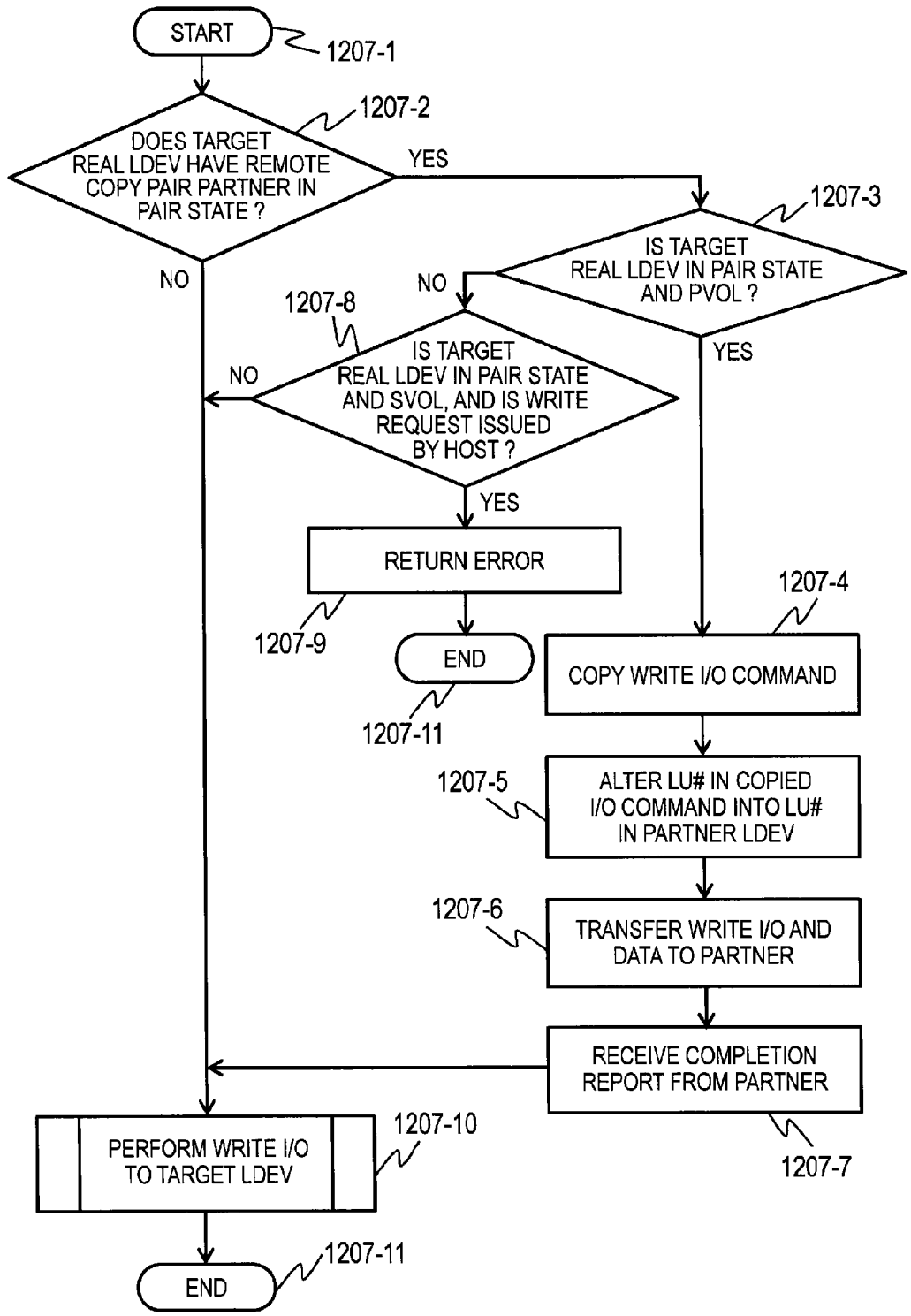
FIG. 9 is a flowchart of a remote copy control program in Example 1.

FIG. 9 is a flowchart illustrating exemplary processing of the remote copy control program 1207. The remote copy control program 1207 is started when the port controller 170 in the physical storage apparatus 100 receives a write request and notifies the processor 150 of it. The write request is sent from a host computer 300 (which represents any one of the host computers) or a different physical storage apparatus 100.

Upon start of the program (1207-1), the remote copy control program 1207 checks whether the write target real LDEV 101 has a remote copy pair partner (1207-2). The write command includes the command type (write), the ID of a virtual LU 203 or a real LU 103, the start address (LBA: logical block address), and the data length (the number of blocks, a block is 512 byte, for example). As will be described later, if the access target is a virtual LU 203, the I/O control program 1202 converts the ID of the virtual LU 203 into the ID of the corresponding real LU 103.

The remote copy control program 1207 searches the LDEV configuration management table 1201 to identify the real LDEV 101 corresponding to the designated real LU 103. Furthermore, the remote copy control program 1207 searches the remote copy management table 1206 for the identified real LDEV 101 to check whether the real LDEV has a remote copy pair partner.

If the target real LDEV 101 does not have configuration for a remote copy pair (No at 1207-2), the remote copy control program 1207 performs data write to the target real LDEV 101 (1207-10) and exits the flow (1207-11). In practice, the remote copy control program 1207 stores the write data and the address to the cache memory 130, and then writes a disk 110 asynchronously.

If the target real LDEV 101 has configuration for a remote copy pair (Yes at 1207-2), the remote copy control program 1207 determines whether to copy the write data to the target real LDEV 101 with reference to the pair state column 12064 and the LDEV attribute column 12065 in the entry of the target LDEV 101 in the remote copy management table 1206 (1207-3).

If the target real LDEV 101 is in a PAIR state and a PVOL (Yes at 1207-3), the remote copy control program 1207 determines to perform the copy, copies the command received from the host computer 300 to the buffer of the port controller 170 for the physical port 102 connected to the physical storage apparatus 100 including the copy destination SVOL (1207-4) and rewrites the ID of the LU to be written into the ID of the LU provided by the pair partner (1705-5).

Taking an example of FIG. 3, upon receipt of a command for a write to the real LU 103A-7 from the host computer 300A, the physical storage apparatus 100A-1 stores the command to the buffer of the port controller 170 for the physical port 102A-2 and rewrites the ID of the LU to be written into 9.

Thereafter, the remote copy control program 1207 instructs the foregoing port controller 170 to transfer the command and the data to the physical storage apparatus the remote copy pair partner belongs to (1207-6). After the transfer, the remote copy control program 1207 waits for a write completion report from the physical storage apparatus of the transfer destination (1207-7). Upon receipt of the report, the remote copy control program 1207 performs the originally instructed write (1207-10) and exits the flow (1207-11).

If the target real LDEV 101 is not in a PAIR state and a PVOL (No at 1207-3), the remote copy control program 1207 determines whether to write to the real LDEV 101 (1207-8). If the target real LDEV 101 is in a PAIR state and an SVOL (Yes at 1207-8), the remote copy control program 1207 cannot accept the write from the host computer 300.

Then, the remote copy control program 1207 checks the ID of the real LU 103 indicated by the write command. The remote copy control program 1207 can determine whether this LU 103 is provided to the host computer 300 from the port ID. If the write command is a command from the host computer 300 and the write target is a real LU 103 that is not provided to the host computer 300 (Yes at 1207-8), the remote copy control program 1207 returns an error (unwritable) to the host computer 300 (1207-9) and exits the flow (1207-11).

If the write target is not a real LU 103 provided to the host computer 300 (No at 1207-8), the remote copy control program 1207 (the physical storage apparatus 100B-2 in the example of FIG. 3) determines that the write data is remote copy data from a PVOL, stores the data in the real LDEV 101 (1207-10), and exits the flow (1207-11).

It should be noted that, if the target real LDEV 101 has a PVOL attribute and is in the pair state of PSUS, the physical storage apparatus 100 can reject the I/O to the PVOL to eliminate the host computer 300 from keeping using the PVOL after switching I/Os to the SVOL because of a failure in the PVOL. A write request received at the real LU 103B-9 may be refused when the state of the SVOL is PSUS, in order to prohibit data in the SVOL to be changed by data copy from the PVOL.

FIGS. 10A to 10F are flowcharts illustrating exemplary processing of the virtual storage manipulation control program 1205. The virtual storage manipulation control program 1205 is started, for example, when the user interface 180 receives a request from an external (such as the management system) and notifies the processor 150 of it. The processing described below can be performed by the virtual storage manipulation control program 1205 at either site. This program properly provides a virtual storage apparatus having the same ID and configured the same at the different site.

Figure 10A:
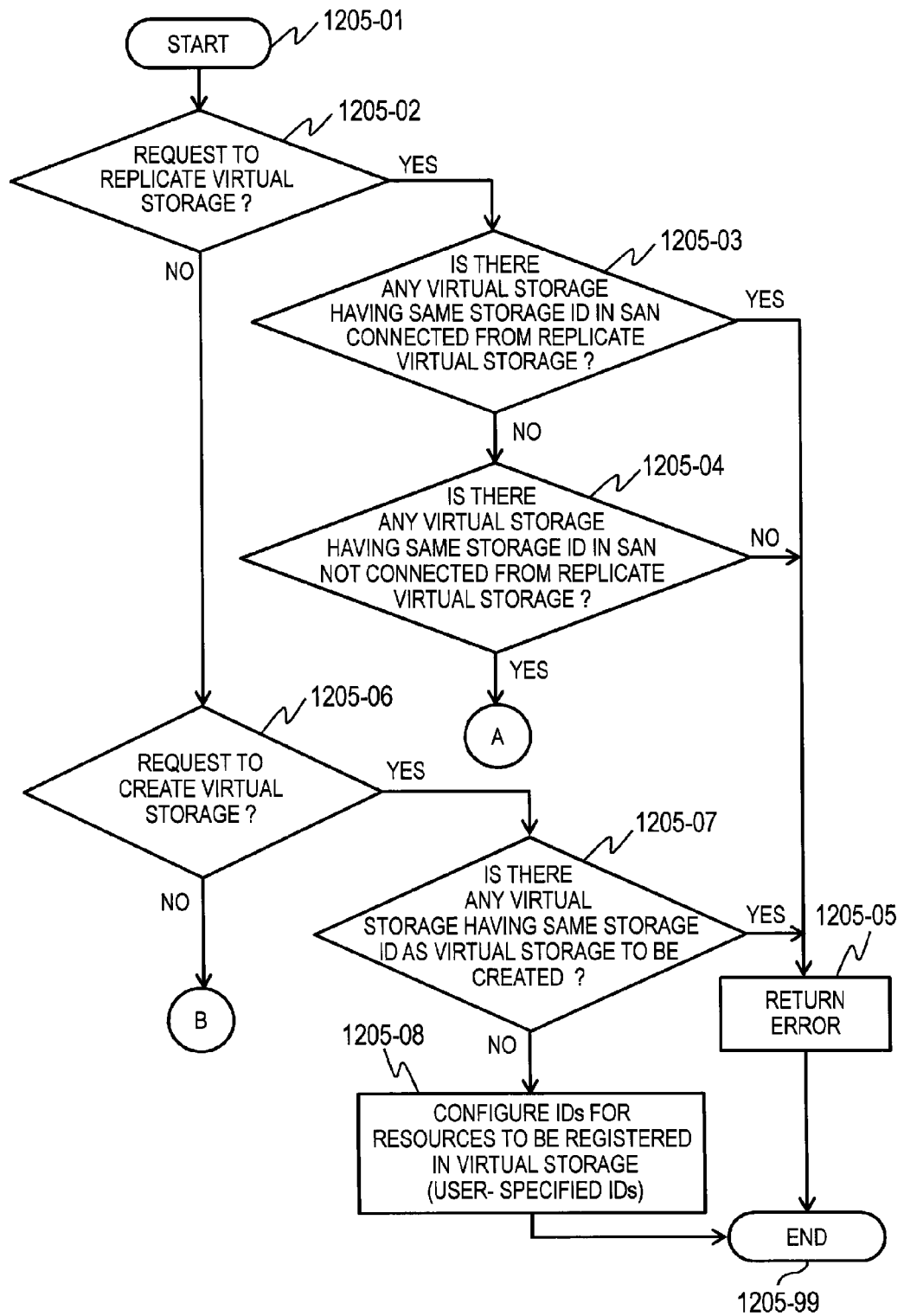
FIG. 10A is a flowchart of a virtual storage apparatus operation control program in Example 1.

In FIG. 10A, upon start of the program (1205-01), the virtual storage manipulation control program 1205 determines the substance of the request (1205-02). If the request is to replicate a virtual storage apparatus (Yes at 1205-02), the ID of the original virtual storage apparatus to be replicated, the IDs of all of the one or more physical storage apparatuses providing the original virtual storage apparatus, and the IDs of physical ports 102 used by the replicate virtual storage apparatus, are provided.

Hereinafter, an example will be described that a virtual storage apparatus provided by a physical storage apparatus is replicated in another physical storage apparatus. In the case of replication of a virtual storage apparatus provided by one or more physical storage apparatuses in one or more physical storage apparatuses, each of the destination physical storage apparatuses performs the processing described below.

Upon receipt of the request for replication (Yes at 1205-02), the virtual storage manipulation control program 1205 requests all the equipment (physical storage apparatuses and host computers) connected to the data network 400 (either one of the networks 400A and 400B) to send the IDs and apparatus types, from all the physical ports 102 provided for virtual ports 202 by the particular physical storage apparatus 100. The physical storage apparatuses each return the ID of the physical storage apparatus and the ID of the virtual storage apparatus provided by the particular physical storage apparatus.

The virtual storage manipulation control program 1205 checks whether a physical or virtual storage apparatus having the same ID as that of the virtual storage apparatus, which the physical storage apparatus 100 running the program 1205 is instructed to replicate, exist in the same network 400, from the responses received from the other apparatuses (1205-03).

This example does not create a plurality of virtual storage apparatuses having the same ID in the same network 400. This is because different physical ports 102 might notify a switch in the data network 400 of the same World Wide Port Name (WWPN).

For this reason, if a virtual storage apparatus having the same ID exists in the same data network 400 (Yes at 1205-03), the virtual storage manipulation control program 1205 rejects the replication of the virtual storage apparatus, informs the user of it (1205-05), and exits the flow (1205-99).

If the foregoing condition is not met (No at 1250-03), the virtual storage manipulation control program 1205 determines whether the physical storage apparatus providing the original virtual storage apparatus can communicate with another physical storage apparatus to provide the replicate virtual storage apparatus (1205-04).

Specifically, the physical storage apparatus 100 to provide the replicate virtual storage apparatus acquires the apparatus types and the IDs of all the equipment connected from all the physical ports 102 which are not provided for virtual ports 202 (the physical ports 102 connected to the other network than the network 400, in this example).

If the acquired IDs do not include the ID of the physical storage apparatus that provides the original virtual storage apparatus (No at 1205-04), no connection has been established to the replication source physical storage apparatus (meaning that remote copy cannot be configured); accordingly, the virtual storage manipulation control program 1205 rejects the replication, informs the user of it (1205-05), and ends (1205-99).

If the physical storage apparatus can communicate with the replication source physical storage apparatus (Yes at 1205), the virtual storage manipulation control program 1205 starts replication of the virtual storage apparatus. This process will be described later with reference to FIG. 10B.

Described hereinafter is a flow in the case where the request received at step 1205-02 is an instruction to create a virtual storage apparatus (Yes at 1205-06). If the request is to create a virtual storage apparatus (Yes at 1205-06), the ID of the virtual storage apparatus to be created, the IDs of the resources (real LDEVs 101, physical ports 102, and real LUs 103) used by the virtual storage apparatus and the IDs in the virtual storage apparatus to be assigned to the resources are informed with the request.

Upon receipt of such a request, the virtual storage manipulation control program 1205 requests all the equipment connected from all the physical ports 102 the physical storage apparatus 100 provides to virtual storage apparatuses to send their apparatus types and IDs (1205-07).

This example does not create a plurality of virtual storage apparatuses having the same ID in the same network 400. This is because different physical ports 102 might notify a switch in the data network 400 of the same WWPN. A WWPN is defined from a physical storage apparatus ID and a physical port ID to insure the uniqueness. The same applies to the virtual storage apparatus environment and it is defined from a virtual storage apparatus ID and a virtual port ID. If a virtual storage apparatus having the same ID exists in the same data network 400 (Yes at 1205-07), the virtual storage manipulation control program 1205 rejects the creation of the virtual storage apparatus, informs the user of it (1205-05), and exists the flow (1205-99).

If no virtual storage apparatus having the same ID exists in the same data network 400 (No at 1205-07), the virtual storage manipulation control program 1205 registers the correspondence between the physical storage apparatus and the virtual storage apparatus and the correspondences between all the real LDEVs 101, physical ports 102, and real LUs 103 instructed to be provided to the virtual storage and the virtual LDEVs 201, virtual ports 202, and virtual LUs 203, respectively, in the virtual resource management table 1204.

It should be noted that, if the table already includes registered resource information, the virtual storage manipulation control program 1205 may return an error without performing this step or may store the new information after deleting the existing resource information. The processing in the case where the request is neither to replicate a virtual storage apparatus nor to create a virtual storage apparatus will be described later with reference to FIG. 10C and the subsequent figures.

Figure 10B:
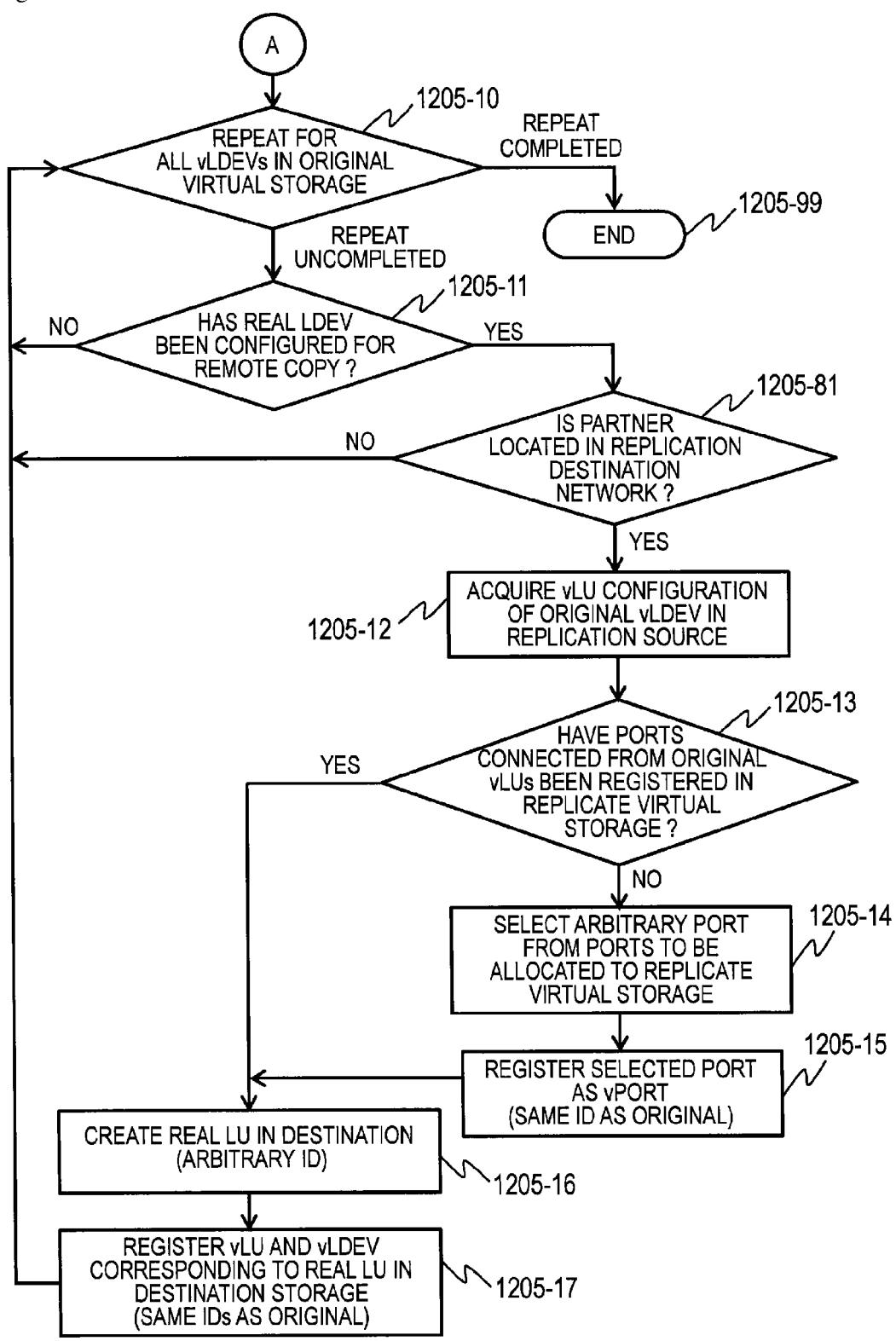
FIG. 10B is a flowchart of the virtual storage apparatus operation control program in Example 1.

FIG. 10B is a flowchart illustrating exemplary replication of a virtual storage apparatus by the virtual storage manipulation control program 1205. This flow is to explain the case where the ID of the physical storage apparatus to provide the replicate virtual storage apparatus has been detected at the step 1205-04.

In this flow, the virtual storage manipulation control program 1205 acquires information on the configuration of the original virtual storage apparatus designated by the request from the source physical storage apparatuses to repeat the processing for all of the virtual LDEVs 201 (1205-10). When the steps subsequent to the step 1205-11 are completed for all of the virtual LDEVs 201 (REPEAT COMPLETED at 1205-10), this program ends (1205-99).

The virtual storage manipulation control program 1205 checks whether remote copy has been configured on the selected virtual LDEV 201 with reference to the remote copy management table 1206 acquired from the physical storage apparatus providing the original virtual storage apparatus 200 (1205-11).

If remote copy has not been configured on the real LDEV 101 corresponding to the particular virtual LDEV 201 (No at 1205-11), the virtual storage manipulation control program 1205 does not register the virtual LDEV 201 in the virtual storage apparatus 200 and returns to the step 1205-10 for the next virtual LDEV 201.

If remote copy has been configured on the real LDEV 101 providing the virtual LDEV 201 (Yes at 1205-11), the virtual storage manipulation control program 1205 identifies the partner real LDEV 101 and determines whether the partner real LDEV 101 is a real LDEV 101 in the destination physical storage apparatus 100 or in a different physical storage apparatus sharing the data network 400 with the destination physical storage apparatus 100 (1205-81).

If the result of determination at step 1205-81 is negative (No at 1205-81), the virtual storage manipulation control program 1205 does not register the virtual LDEV 201 in the virtual storage apparatus and returns to the step 1205-10 for the next LDEV.

If the result of determination at step 1205-81 is positive (Yes at 1205-81), the virtual storage manipulation control program 1205 registers the virtual LDEV 201. The processor 150 (virtual storage manipulation control program 1205) that actually performs the registration is the processor 150 (virtual storage manipulation control program 1205) in the physical storage apparatus to which the real LDEV 101 of the remote copy pair partner belongs.

The virtual storage manipulation control program 1205 acquires the configuration of the real LDEV 101 corresponding to the original virtual LDEV 201 from the virtual resource management table 1204 in the replication source. Next, the virtual storage manipulation control program 1205 acquires the IDs of the real LUs 103 using the real LDEV 101 and the IDs of the physical ports providing the LUs 103 from the LDEV configuration management table 1201 in the replication source. The virtual storage manipulation control program 1205 acquires the IDs of the virtual LUs 203 and the virtual ports 202 corresponding to the foregoing real LUs 103 and the foregoing physical ports 102 from the virtual resource management table 1204 in the physical storage apparatus providing the original virtual storage apparatus (1205-12).

The virtual storage manipulation control program 1205 checks whether the acquired virtual ports 202 have already been registered in the replicate virtual storage apparatus with reference to the virtual resource management table 1204 in the physical storage apparatus providing the replicate virtual storage apparatus (1205-13).

If the virtual ports 202 have already been registered (Yes at 1205-13), the virtual storage manipulation control program 1205 can skip the registration of the virtual ports 202 to register the virtual LUs 203 and the virtual LDEV 201.

If the virtual ports 202 have not been registered yet (No at 1205-13), the virtual storage manipulation control program 1205 selects an arbitrary unregistered physical port 102 from the physical ports 102 advised with the request for replication of virtual storage apparatus (1205-14). If the virtual storage apparatus is configured with a plurality of physical storage apparatuses, it is preferable that the selected physical port 102 be a physical port 102 in the physical storage apparatus including the target real LDEV 101.

The virtual storage manipulation control program 1205 assigns the ID of the virtual port 202 to the selected physical port 102 and registers it in the virtual resource management table 1204 in the destination physical storage apparatus (1205-15).

Hereinafter, registration of a virtual LU 203 and a virtual LDEV 201 will be described. The virtual storage manipulation control program 1205 creates a new real LU 103 provided by the physical port 102 corresponding to the virtual port 202 in the physical storage apparatus to which the physical port 102 belongs. The real LU 103 is assigned an arbitrary unused ID. The virtual storage manipulation control program 1205 stores the relation of the real LDEV 101, the physical port 102, and the real LU 103 in the LDEV configuration management table 1201 in the destination physical storage apparatus (1205-16).

The virtual storage manipulation control program 1205 assigns IDs in the virtual storage apparatus to the real LU 103 and the real LDEV 101. These virtual IDs are the same as the virtual IDs in the original. The virtual storage manipulation control program 1205 stores relations between the real LU 103 and the virtual LU 203, and between the real LDEV 101 and the virtual LDEV 201 in the virtual resource management table 1204 in the copy destination physical storage apparatus to complete the registration (1205-17).

The virtual storage manipulation control program 1205 performs the aforementioned processing on all of the virtual LDEVs 201. It should be noted that the virtual storage manipulation control program 1205 multicasts information in the virtual resource management table 1204 required by other physical storage apparatuses to the other physical storage apparatuses.

Figure 10C:
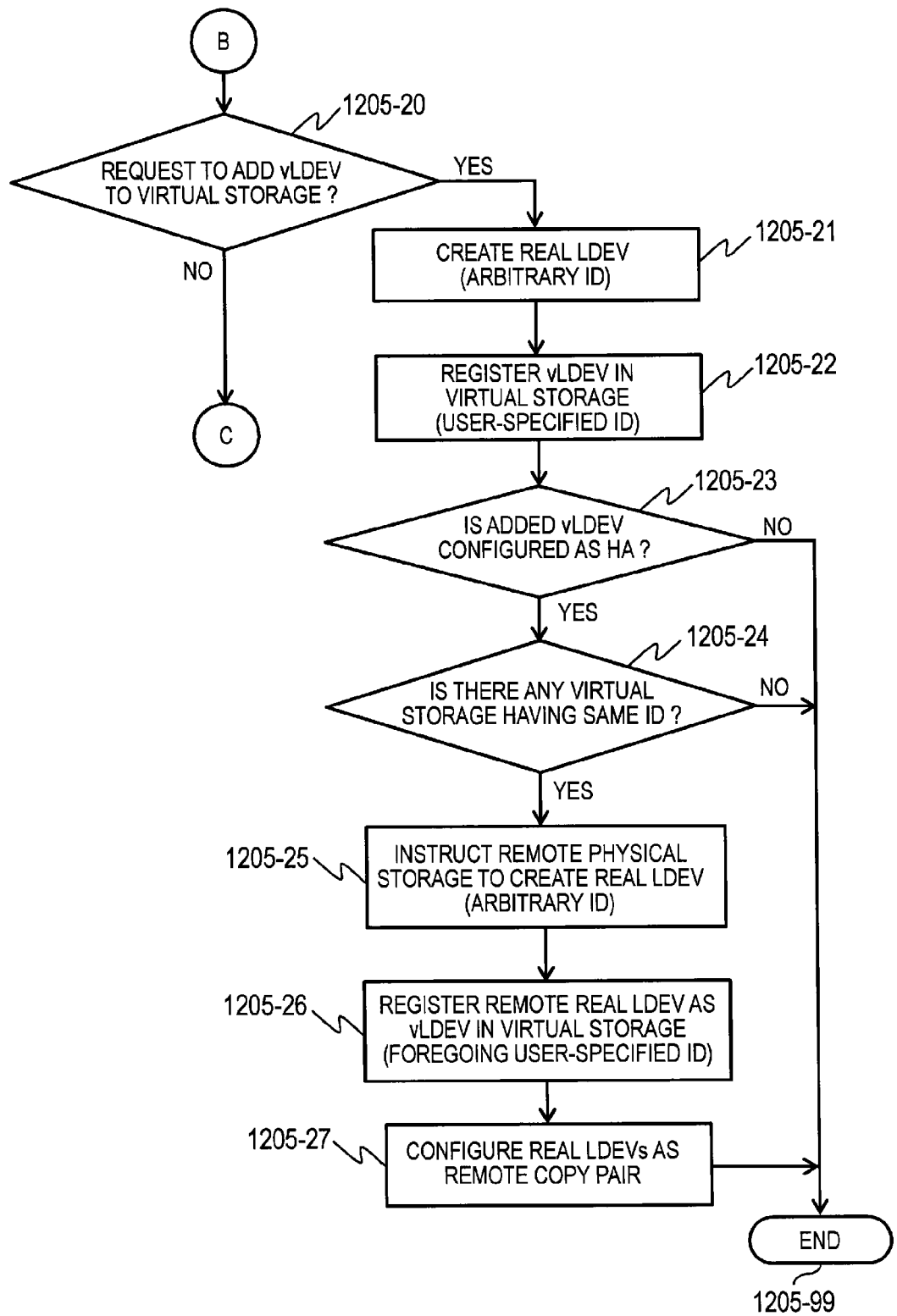
FIG. 10C is a flowchart of the virtual storage apparatus operation control program in Example 1.

FIG. 10C is a flowchart illustrating exemplary processing of the virtual storage manipulation control program 1205 in the case where the request at the step 1205-06 is not to create a virtual storage apparatus but to add a virtual LDEV 201.

If the request is an instruction to add a virtual LDEV (Yes at 1205-20), the ID, the capacity, and the mode of the virtual LDEV 201 to be added and the ID of the virtual storage apparatus to which the virtual LDEV is added are advised with the request. The mode indicates the availability level of the particular virtual LDEV 201 and there are at least two modes: NORMAL and HA.

Upon receipt of such a request (Yes at 1205-20), the virtual storage manipulation control program 1205 in the physical storage apparatus 100 that has received the request selects a plurality of arbitrary disks 110 to create a real LDEV 101. The real LDEV 101 can be created from a thin provisioning pool.

The ID assigned to the created real LDEV 101 is arbitrarily selected from unused IDs. The virtual storage manipulation control program 1205 stores configuration information used to create the real LDEV 101 in the LDEV configuration management table 1201 (1205-21).

The virtual storage manipulation control program 1205 registers the combination of the ID of the created real LDEV 101 and the ID of the virtual LDEV 201 advised with the request in the virtual resource management table 1204 (1205-22). If the ID of the virtual LDEV 201 is already in use, the virtual storage manipulation control program 1205 rejects the creation of the real LDEV 101 and the registration of the virtual LDEV 201.

Next, the virtual storage manipulation control program 1205 determines whether to perform remote copy of the created real LDEV 101 between physical storage apparatuses 100. If the mode of the virtual LDEV 201 is HA (Yes at 1205-23) and the virtual resource management table 1204 indicates that the relevant virtual storage apparatus is also provided by a physical storage apparatus 100 belonging to a different data network 400 (Yes at 1205-24), it is necessary to create an LDEV to be a remote copy pair partner.

If either one of the conditions at the steps 1205-23 and 1205-24 is not satisfied, the virtual storage manipulation control program 1205 terminates its processing (1205-99).

Hereinafter, creation of a real LDEV 101 of a remote copy pair partner and configuration for remote copy pair will be described. The virtual storage manipulation control program 1205 instructs the above-mentioned physical storage apparatus 100 belonging to the different network 400 (a remote physical storage apparatus 100) to create a real LDEV 101 with information on the capacity of the real LDEV 101 to be created (the same capacity as that of the virtual LDEV 201). The instructed physical storage apparatus 100 creates a real LDEV 101 having an arbitrary unused ID and the specified capacity, and reports the completion (1205-25).

Next, the virtual storage manipulation control program 1205 instructs the remote physical storage apparatus 100 to register a virtual LDEV 201 having the same ID as the added virtual LDEV 201 with respect to the created real LDEV 101. The instructed remote physical storage apparatus 100 configures the ID specified for the virtual LDEV 201 on the real LDEV 101 and reports the completion (1205-26).

The processing in the remote physical storage apparatus 100 at the steps 1205-25 and 1205-26 is the same as the processing at the steps 1205-21 and 1205-22.

After the above-described processing, the virtual storage manipulation control program 1205 registers the real LDEVs 101 of the remote copy pair in the remote copy management table 1206. The real LDEV 101 in the remote physical storage apparatus 100 instructed to create a real LDEV 101 is provided with a PVOL attribute and the other real LDEV 101 is provided with an SVOL attribute. The pair state should be PAIR. Through the series of processing, the processing is terminated (1205-99) The processing in the case where, at the step 1205-20, the request is not an instruction to add a virtual LDEV (No at 1205-20) will be described with reference to FIG. 10D.

Figure 10D:
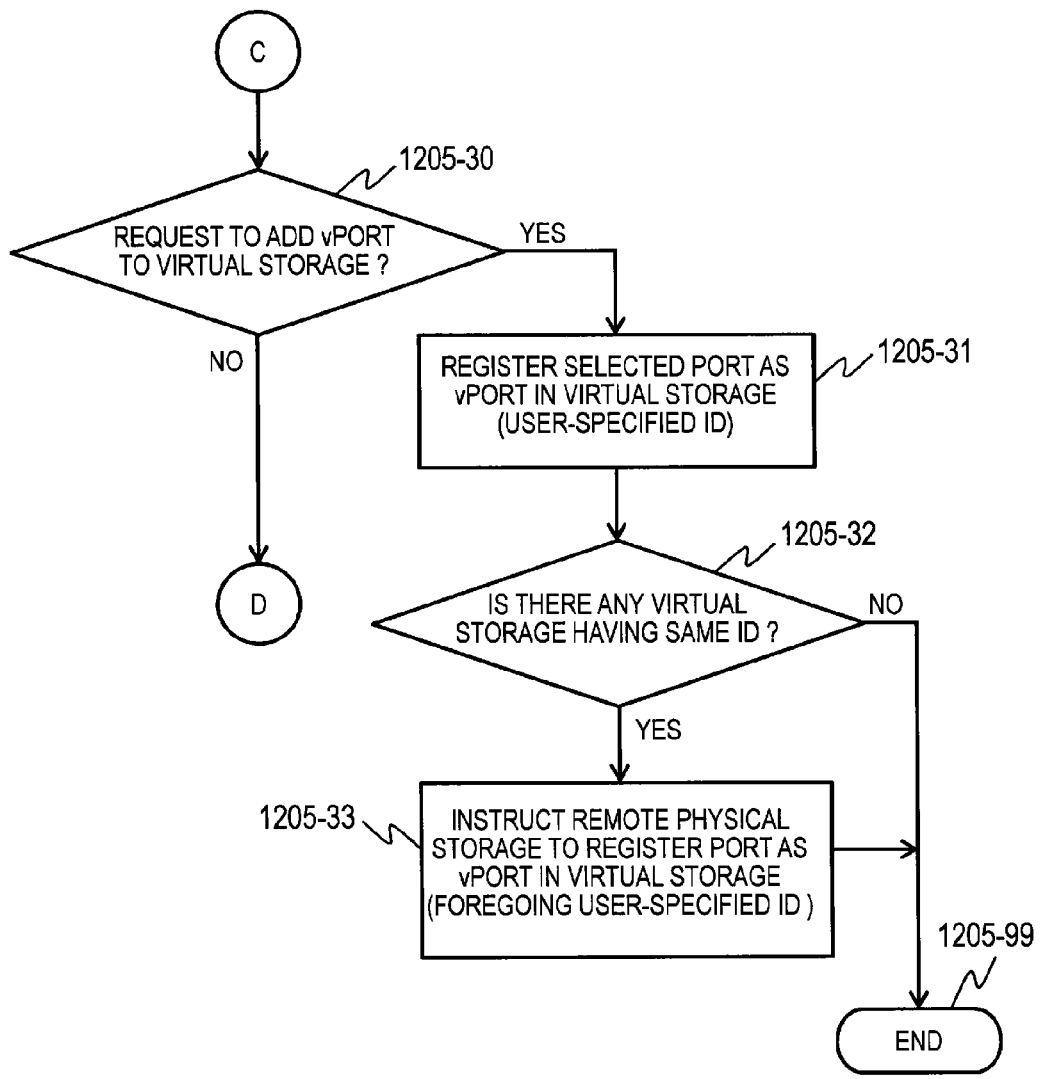
FIG. 10D is a flowchart of the virtual storage apparatus operation control program in Example 1.

FIG. 10D is a flowchart illustrating exemplary processing of the virtual storage manipulation control program 1205 in the case where the request is not to add a virtual LDEV at the step 1205-20 in FIG. 10C.

If the request is an instruction to add a virtual port, the IDs of the physical port and virtual port to be added are advised with the request. The administrator may input the ID of the physical port 102 in the remote storage apparatus as necessary (if it is not preferable to select the physical port 102 automatically).

Upon receipt of a request to add a virtual port (Yes at 1205-30), the virtual storage manipulation control program 1205 configures a virtual port 202 on the designated physical port 102 in the virtual resource management table 1204.

Next, the virtual storage manipulation control program 1205 determines whether to apply this configuration to the remote virtual storage apparatus. If the virtual resource management table 1204 indicates that the virtual storage apparatus is also provided from a physical storage apparatus 100 belonging to a different network 400 (Yes at 1205-32), the remote physical storage apparatus 100 requires the same configuration. Otherwise (No at 1205-32), the virtual storage manipulation control program 1205 terminates its processing (1205-99).

Hereinafter, a method of configuring a virtual port 202 in the remote physical storage apparatus 100 will be described. If the instruction to create a virtual port includes a designation of physical port 102 in the remote side, the virtual storage manipulation control program 1205 selects the designated physical port 102, otherwise, it selects an unused physical port 102 for a virtual port 202 and instructs the remote physical storage apparatus 100 to register the physical port as a virtual port 202 in the virtual resource management table 1204.

Upon receipt of the instruction, the remote physical storage apparatus 100 performs the above-described registration. In this registration, the ID set to the virtual port 202 is the same one as registered at the step 1205-31 (1205-33). Through the series of steps, the processing is terminated (1205-99).

Figure 10E:
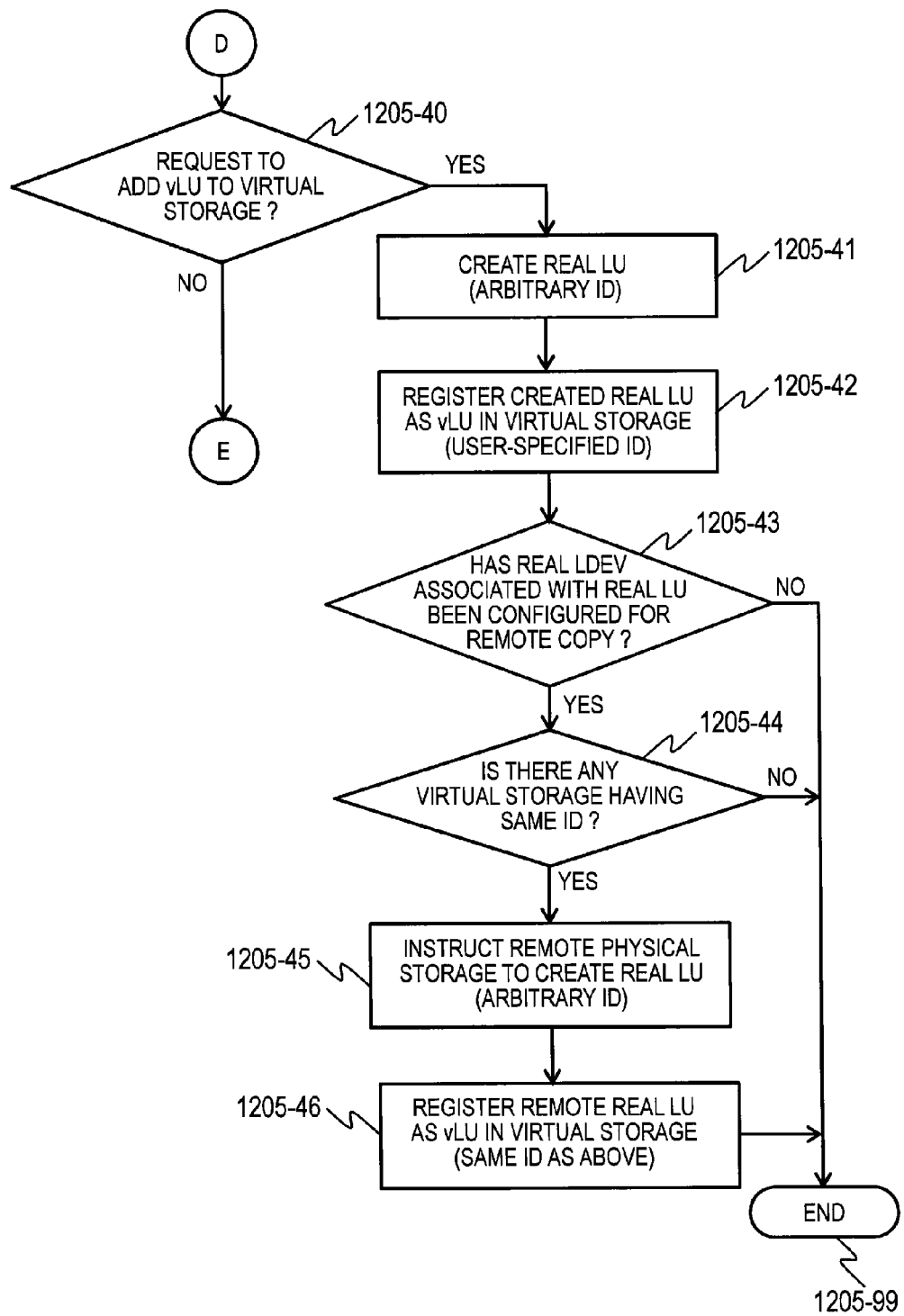
FIG. 10E is a flowchart of the virtual storage apparatus operation control program in Example 1.

FIG. 10E is a flowchart illustrating exemplary processing of the virtual storage manipulation control program 1205 in the case where the request is not to add a virtual port at the step 1205-30.

If the request is an instruction to add a virtual LU, the IDs of the virtual storage apparatus to be manipulated, the virtual LU 203 to be created, the virtual port 202 on which the virtual LU 203 is to be created, and the virtual LDEV 201 to be used by the virtual LU 203 are advised with the request. If the virtual LDEV 201 or the virtual port 202 does not exist in the target virtual storage apparatus, the virtual storage manipulation control program 1205 may reject the creation of the virtual LU 203.

Upon receipt of a request to add a virtual LU (Yes at 1205-40), the virtual storage manipulation control program 1205 acquires information on the real LDEV 101 and the physical port 102 corresponding to the designated virtual LDEV 201 and virtual port 202 from the resource management table 1204. The virtual storage manipulation control program 1205 registers the relation of the real LDEV 101, the physical port 102, and the real LU 103 to the LU configuration management table 1200 and the LDEV configuration management table 1201. As the ID of the real LU 103 in this registration, an arbitrary unused ID which is not used for the other real LUs 103 associated with the physical port 102 is selected (1205-41).

The virtual storage manipulation control program 1205 creates a virtual LU 203 after creating a real LU 103. The virtual LU 203 is defined by storing the IDs of the virtual LU 203 and the real LU 103 in the virtual resource management table 1204. The virtual storage manipulation control program 1205 uses the ID of the virtual LU 203 specified with the instruction to create a virtual LU as the ID assigned to the virtual LU 203 (1205-42).

Next, the virtual storage manipulation control program 1205 checks whether a remote copy pair is configured on the real LDEV 101 corresponding to the virtual LDEV 201 on which the subject virtual LU 203 is mounted. The virtual storage manipulation control program 1205 refers to the remote copy management table 1206 for the real LDEV 101 ascertained at the step 1205-41 to identify its pair state and the real LDEV 101 of the partner (1205-43).

If the real LDEV 101 has a remote copy pair partner (Yes at 1205-43), the virtual storage manipulation control program 1205 checks whether the both real LDEVs of the pair are connected to different data networks 400 and provided for virtual storage apparatuses having the same ID with reference to the virtual resource management table 1204 (1205-44).

If the real LDEV 101 does not have a remote copy pair partner (No at 1205-43) or the real LDEVs of the pair are not provided for the virtual storage apparatuses having the same ID (No at 1205-44), the virtual storage manipulation control program 1205 ends without performing the subsequent processing (1205-99).

The virtual storage manipulation control program 1205 instructs the remote physical storage apparatus to define a real LU 103 for the real LDEV 101 of the remote copy pair partner. As the physical port 102 to be used for the real LU, the physical port 102 corresponding to the virtual port 202 having the same ID as the virtual port 202 selected at step 1205-41 is selected. The instructed remote physical storage apparatus stores the relation of the real LU 103, the real LDEV 101, and the physical port 102 in the LU configuration management table 1200 and the LDEV configuration management table 1201 in the local physical storage apparatus. The ID of the real LU 103 to be set is selected arbitrarily from unused ones (1205-45).

Next, the virtual storage manipulation control program 1205 instructs the remote physical storage apparatus to configure a virtual LU 203 on the created real LU 103. The instructed remote physical storage apparatus stores the relation between the virtual LU 203 and the real LU 103 in its virtual resource management table 1204. The ID assigned to the virtual LU 203 is the same as the one assigned at the step 1205-42 (1205-46).

Through the series of steps, the processing is terminated (1205-99). It should be noted that if the subject real LDEV 101 does not have a remote copy pair partner, the host computer at one site detects the real LU 103 but the host computer at the other site cannot detect a real LU 103 having the same ID; accordingly, the virtual storage manipulation control program 1205 may conclude an error.

For this reason, the physical storage apparatus may create a real LU 103 which is not associated with a real LDEV 101 and assigns the same ID as the real LU 103 at one site to be recognized by the host computer. If the host computer performs I/O to this real LU 103, the result will be an error; however, if the host computer issues an inquiry, the physical storage apparatus returns the same response as the response about the real LU 103 at the other site.

Figure 10F:
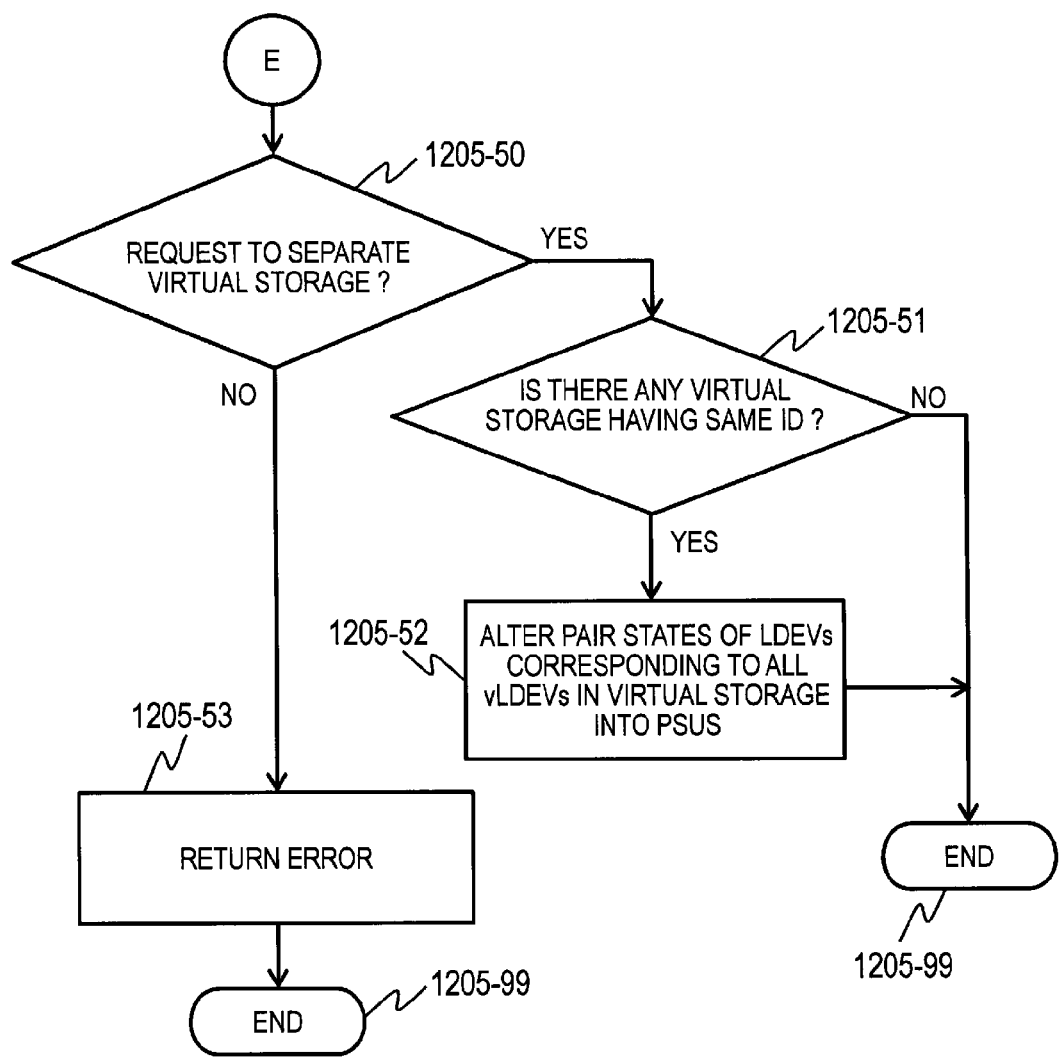
FIG. 10F is a flowchart of the virtual storage apparatus operation control program in Example 1.

FIG. 10F is a flowchart illustrating exemplary processing of the virtual storage manipulation control program 1205 in the case where the request is not to add a virtual LU at the step 1205-40 (No at 1205-40).

If the request is an instruction to separate virtual storage, the ID of the virtual storage apparatus to be manipulated is advised with the request. Upon receipt of a request to separate virtual storage (Yes at 1205-50), the virtual storage manipulation control program checks whether a virtual storage apparatus having the specified ID exists with reference to the virtual resource management table 1204 (1205-51). If such a virtual storage apparatus does not exist (No at 1205-51), the virtual storage manipulation control program 1205 terminates the processing (1205-99).

If such a virtual storage apparatus exists (Yes at 1205-51), the virtual storage manipulation control program 1205 alters the remote copy pair states of all the real LDEVs 101 corresponding to all the virtual LDEVs 201 of the virtual storage apparatus into PSUS (1205-52). This is accomplished by altering the remote copy management table 1206. Through the series of steps, the processing is terminated (1205-99).

It should be noted the method of manipulating tables described in JP 2005-190456 A can be employed to guarantee the consistency of I/O among a plurality of physical storage apparatuses 100. It should be noted, at step 1205-50, if the request is not an instruction to separate virtual storage (No at 1205-50), the virtual storage manipulation control program 1205 reports an error (1205-53) to end the processing (1205-99). It should be noted that an instruction to separate virtual storage may be issued by the clustering software 301 in the host computer 300.

Figure 11:
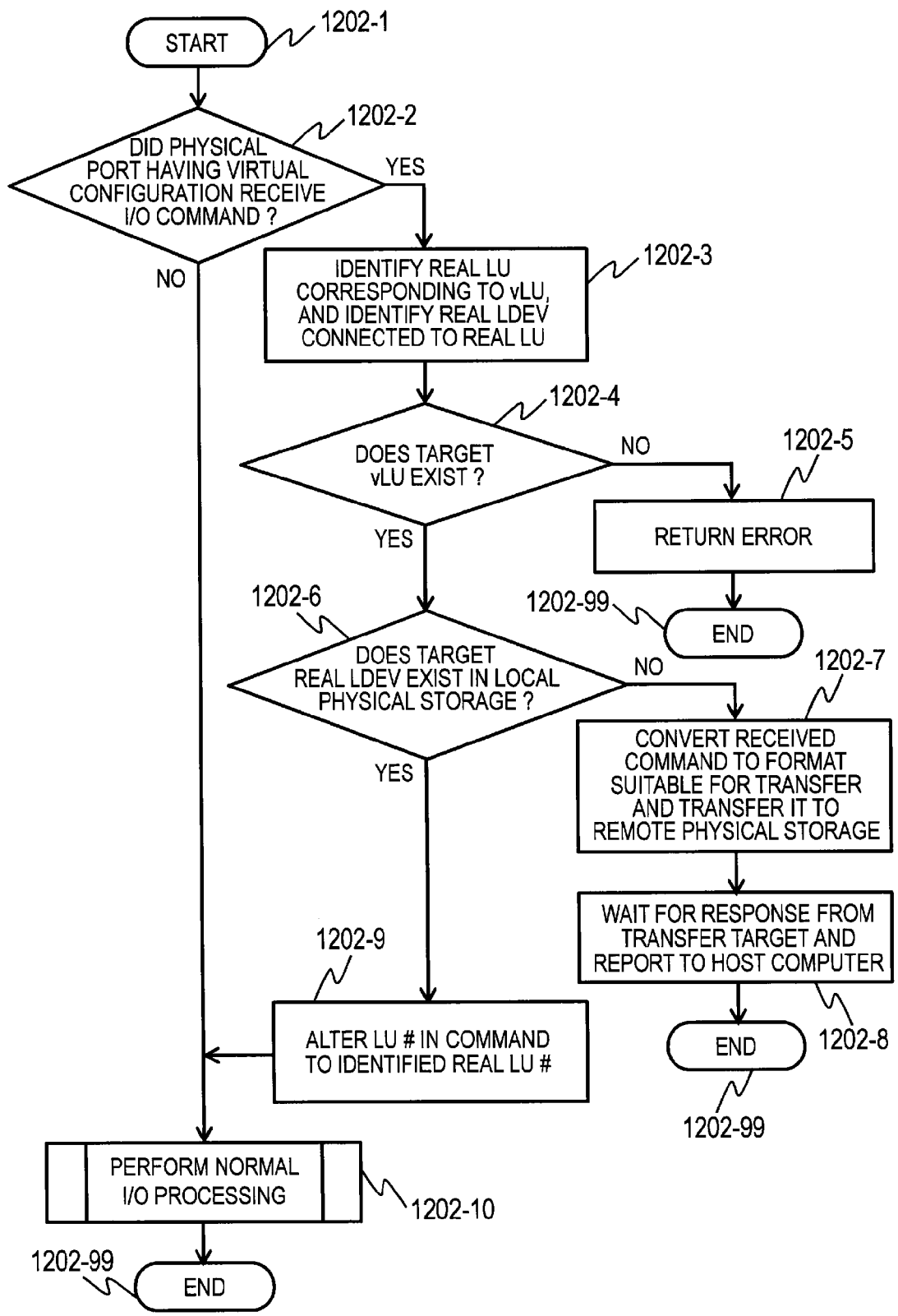
FIG. 11 is a flowchart of an I/O control program in Example 1.

FIG. 11 is a flowchart illustrating exemplary processing of the I/O control program 1202. The I/O control program 1202 is started when a physical port 102 receives an I/O command from a host computer 300 and notifies the processor 150 of it. The command type and associated information is provided to an I/O command. For example, if the command type is "write" or "read", the associated information designates the start LBA of the access destination and the block length of the data (1 block is 512 byte).

Upon start of this program (1202-1), the I/O control program 1202 checks whether the accessed physical port 102 is configured as a virtual port 202 with reference to the virtual resource management table 1204 (1202-2). If it is not configured as a virtual port 202 (No at 1202-2), the I/O control program 1202 performs normal I/O processing (1202-10). The normal I/O processing means cache control, data transfer, response control to the host computer 300, and the like.

If the physical port 102 is configured as a virtual port 202 (Yes at 1202-2), the I/O control program 1202 identifies the real LU 103 corresponding to the virtual LU 203 of the I/O target designated by the I/O command with reference to the virtual resource management table 1204. Then, the I/O control program 1202 refers to the LU configuration management table 1200 for the identified real LU 103 to identify the associated real LDEV (1202-3).

If the result of the step 1202-3 indicates that no virtual LU 203 exists (No at 1202-4), the I/O control program 1202 returns an error to the host computer 300 (1202-5) to end (1202-99). Also, if the consultation with the LDEV configuration management table 1201 results in determination that a virtual LU 203 and a real LU 103 are defined but a real LDEV 101 is not defined, the I/O control program 1202 returns an error to the host computer 300 (1202-5) to end (1202-99).

If the foregoing error conditions are not met (Yes at 1202-4), the I/O control program 1202 identifies the physical storage apparatus 100 in which the real LDEV 101 is defined with reference to the LU configuration management table 1200. If the target real LDEV 101 is located in the same physical storage apparatus 100 as the physical port 102 (Yes at 1202-6), the I/O control program 1202 alters the LU number in the received command from the ID of the virtual LU 203 into the ID of the real LU 103 and performs normal I/O processing (1202-10) to end (1202-99).

If the target real LDEV 101 and the physical port 102 are not located in the same physical storage apparatus 100 (No at 1202-6), the I/O control program 1202 instructs the physical storage apparatus 100 including the target real LDEV 101 to perform processing on the real LDEV 101 (1202-7) and reports to the host computer 300 after completion of the processing (1202-8).

The I/O control program 1202 terminates the processing through the series of steps (1202-99). An instruction to separate virtual storage may be issued by the clustering software 301 of the host computer 300. The data is transferred after the I/O command handling according to the same operation as the I/O command.

Figure 12:
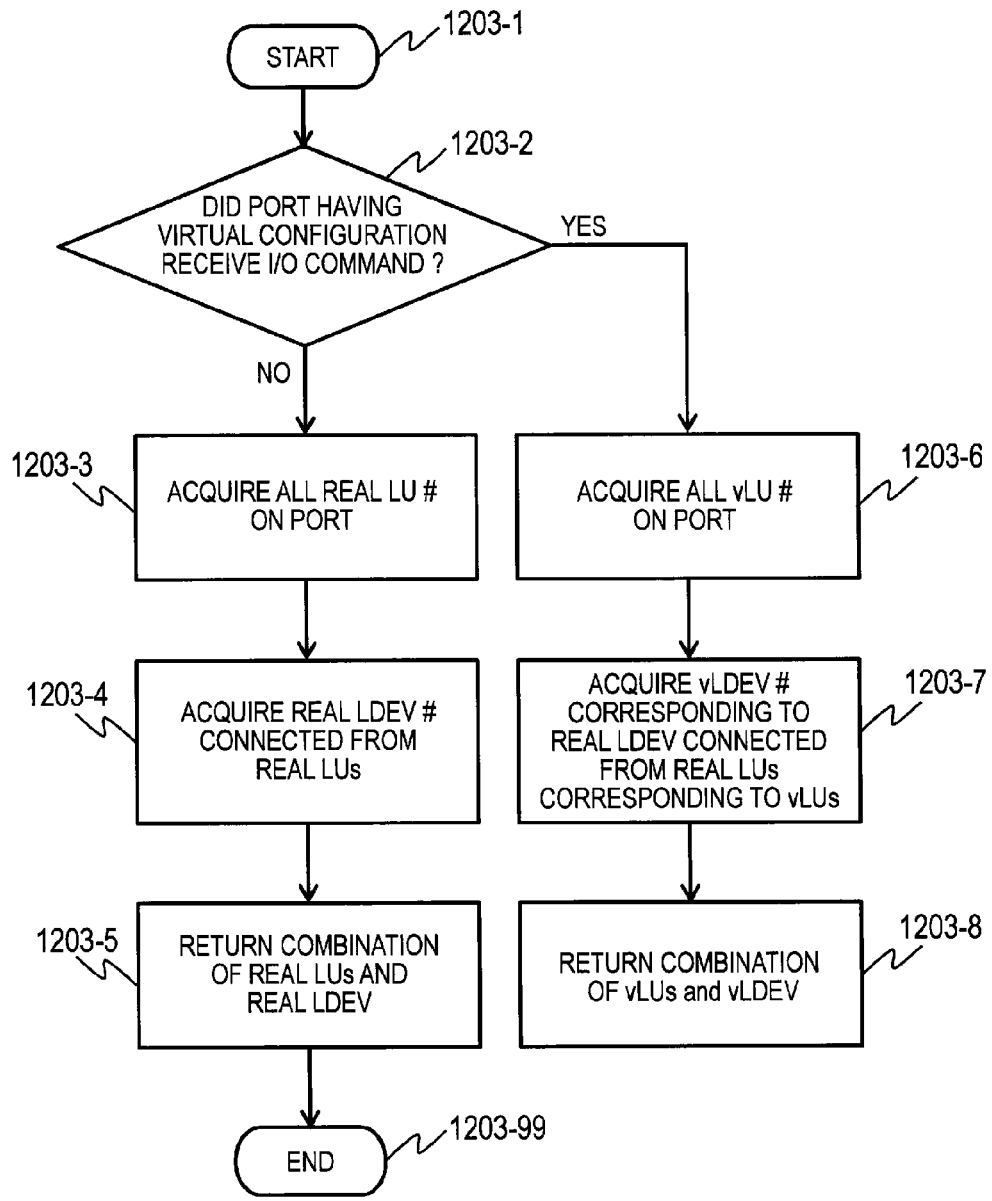
FIG. 12 is a flowchart of a configuration report control program in Example 1.

FIG. 12 is a flowchart illustrating exemplary processing of the configuration report control program 1203. The configuration report control program 1203 is started when a physical port 102 receives an inquiry command from a host computer 300 and notifies the processor 150 of it.

Upon start of this program (1203-1), the configuration report control program 1203 checks whether the accessed physical port 102 is configured as a virtual port 202 with reference to the virtual resource management table 1204 (1203-2).

If the physical port 102 is not configured as a virtual port 202 (No at 1203-2), the configuration report control program 1203 performs normal responding to the inquiry, which means that the program 1203 acquires information on all the real LUs 103 provided by the particular physical port 102 from the LU configuration management table 1202 (1203-3).

The configuration report control program 1203 acquires configuration information on the real LDEV 103 associated with these real LUs 103 from the LDEV configuration management table 1201 (1203-4). The configuration report control program 1203 reports the associations of these real LUs 103 with the real LDEV 101 and the configuration of the real LDEV 101 to the host computer 300 (1203-5).

If the physical port 102 is configured as a virtual port 202 (Yes at 1203-2), the configuration report control program 1203 acquires the information on all the real LUs 103 provided by the physical port 102 with reference to the LU configuration management table 1202 and, thereafter, selects the IDs of the virtual LUs 203 corresponding to the real LUs 103 from the virtual resource management table 1204 (1203-6).

After acquiring the configuration information on the real LDEV 101 associated with these real LUs 103 from the LDEV configuration management table 1201, the configuration report control program 1203 selects the ID of the virtual LDEV 201 corresponding to the real LDEV 101 from the virtual resource management table 1204 (1203-7).

The configuration report control program 1203 further selects the ID of the virtual storage apparatus including the selected virtual LUs 203 and the ID of the foregoing virtual port from the virtual resource management table 1204. The configuration report control program 1203 reports the association of these virtual LUs 203 with the virtual LDEV 201, the configuration of the real LDEV 101, and information on the virtual storage apparatus and the virtual ports to the host computer 300 (1203-8).

Figure 13:
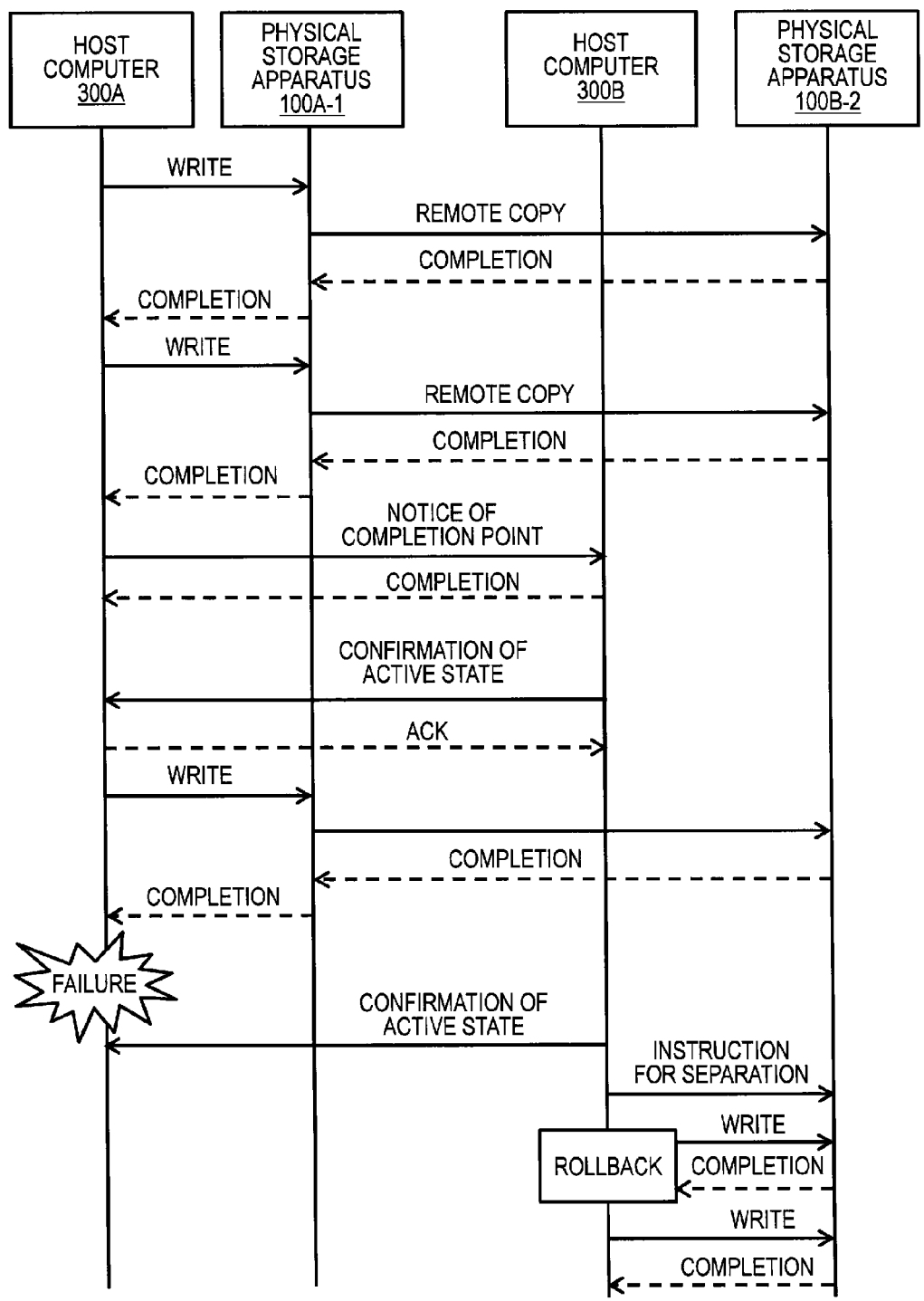
FIG. 13 is a sequence diagram of failure recovery in use of synchronous remote copy in Example 1.

FIG. 13 is a sequence diagram illustrating switching of the processing when a failure happens to the system. It is assumed that the following conditions are satisfied in this system. Clustering is configured on the pair of the host computers 300A and 300B. Furthermore, remote copy is configured on the pair of the physical storage apparatuses 100A-1 and 100B-2. In this example, the physical storage apparatuses 100A-1 and 100B-2 perform synchronous remote copy.

The host computer 300A is connected to the physical storage apparatus 100A-1 and the host computer 300B is connected to the physical storage apparatus 100B-2. The physical storage apparatus 100A-1 provides the host computer 300A with a real LDEV having a PVOL attribute and the physical storage apparatus 100B-2 provides the host computer 300B with a real LDEV having an SVOL attribute. These real LDEVs form a remote copy pair and the pair state thereof is PAIR.

In this environment, in synchronous with a write from the host computer 300A to the physical storage apparatus 100A-1, the physical storage apparatus 100A-1 transfers the written data to the physical storage apparatus 100B-2 to write to the physical storage apparatus 100B-2.

The host computer 300A periodically notifies the host computer 300B of an operation completion point. The host computer 300B periodically confirms its active state to the host computer 300A. Upon receipt of the confirmation of active state, the host computer 300A returns an acknowledgement (ACK) to the host computer 300B.

If the ACK has not been returned for a predetermined time or more, the host computer 300B determines that a failure has occurred to the host computer 300A and takes over the operations of the host computer 300A. The host computer 300B instructs the physical storage apparatus 100B-2 to separate the virtual storage apparatus. The host computer 300B performs a rollback to restore the data integrity and then starts normal I/O.

Figure 14:
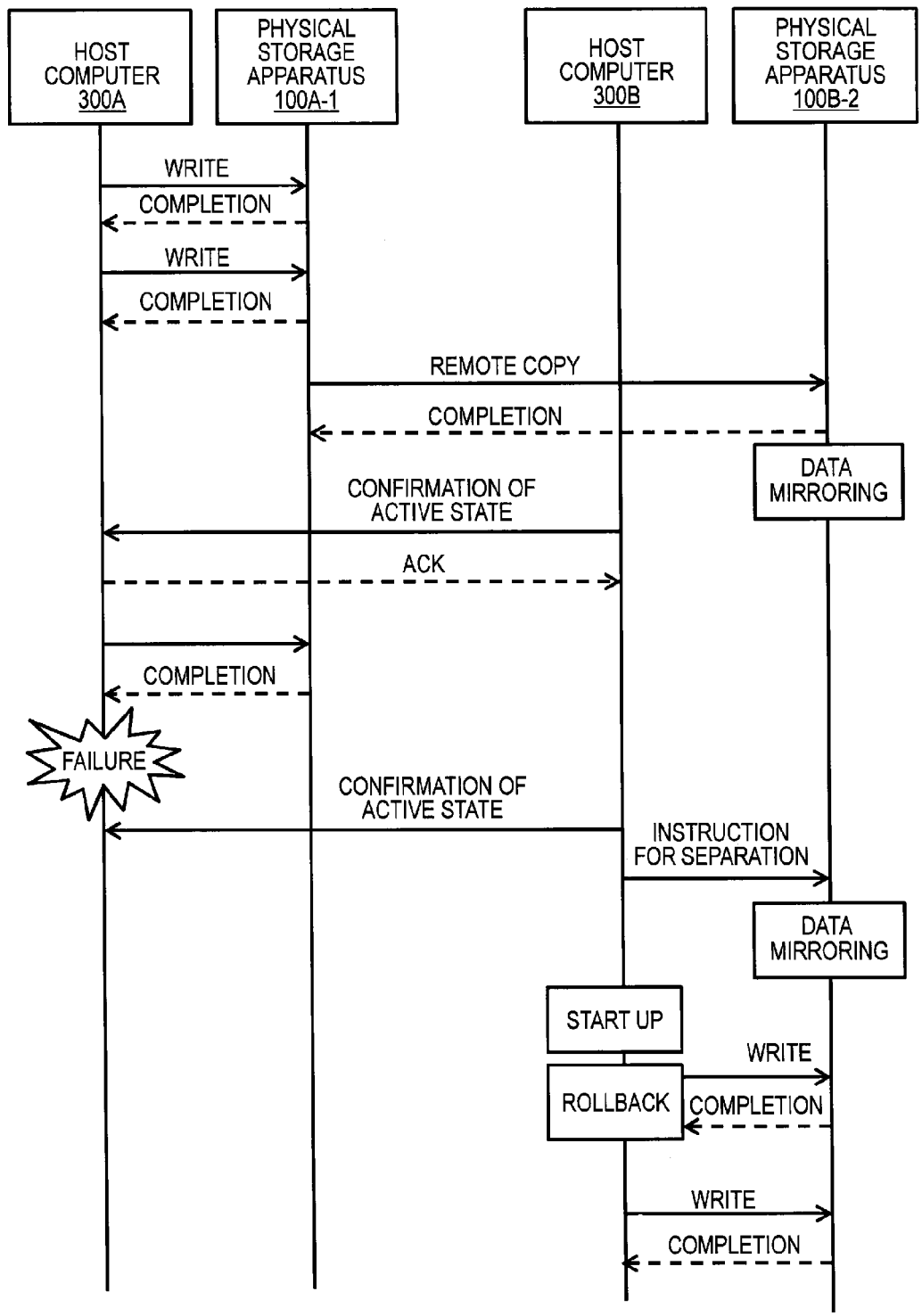
FIG. 14 is a sequence diagram of failure recovery in use of asynchronous remote copy in Example 1.

FIG. 14 is a sequence diagram illustrating switching of the processing when a failure happens to the system. It is assumed that the following conditions are satisfied in this system. Clustering is configured on the pair of the host computers 300A and 300B. The host computer 300A is connected to the physical storage apparatus 100A-1 and the host computer 300B is connected to the physical storage apparatus 100B-2. Remote copy is configured on the pair of the physical storage apparatuses 100A-1 and 100B-2. In this example, the physical storage apparatuses 100A-1 and 100B-2 perform asynchronous remote copy.

The physical storage apparatus 100A-1 provides the host computer 300A with a real LDEV having a PVOL attribute and the physical storage apparatus 100B-2 provides the host computer 300B with a real LDEV having an SVOL attribute. These real LDEVs form a remote copy pair and the pair state thereof is PAIR.

In this environment, after the host computer 300A has written to the physical storage apparatus 100A-1, the physical storage apparatus 100A-1 transfers the written data to the physical storage apparatus 100B-2 asynchronously with the write. After completion of the transfer, the physical storage apparatus 100B-2 writes the transferred data to the real LDEV.

The host computer 300B periodically confirms its active state to the host computer 300A. Upon receipt of the confirmation of active state, the host computer 300A returns an acknowledgement (ACK) to the host computer 300B. If the ACK has not been returned for a predetermined time or more, the host computer 300B determines that a failure has occurred to the host computer 300A and takes over the operations of the host computer 300A. The host computer 300B instructs the physical storage apparatus 100B-2 to separate the virtual storage apparatus. The host computer 300B performs a rollback to restore the data integrity after the start-up of the OS and application programs accompanying the failure and then starts normal I/O.

This example can provide a remote copy environment using the clustering function for host computers. Besides, this example can reduce the information on remote copy configuration for storage apparatuses in management of host computers and consequently reduce the management cost for the host computers.

Example 2

Example 2 will be described hereinafter. In this example, a virtual storage apparatus having the same ID as a physical storage apparatus introduced to one site is created at the other site. The following description mainly explains differences from Example 1.

Figure 15:
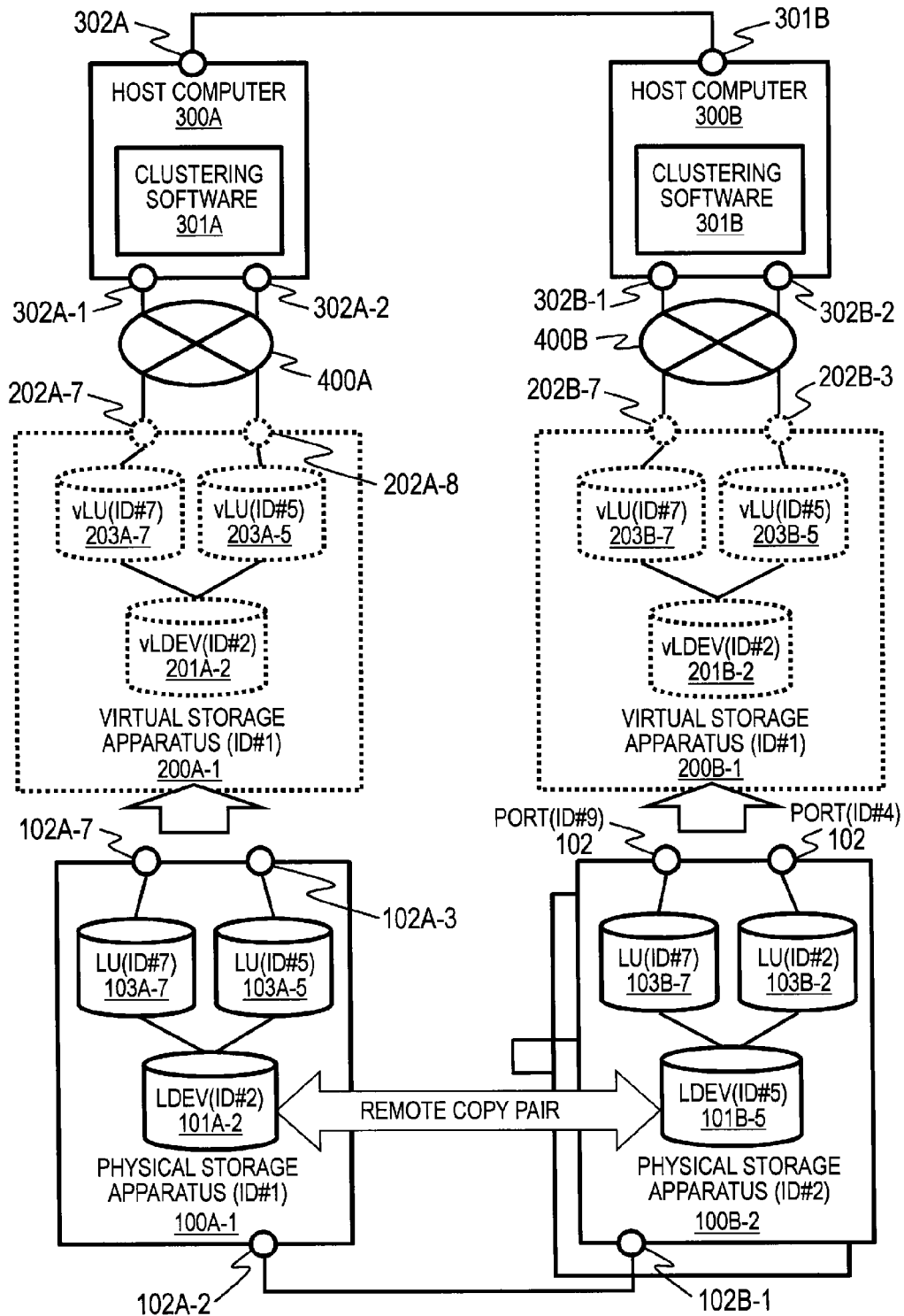
FIG. 15 schematically illustrates a configuration of a virtual storage apparatus that conceals remote copy configuration from host computers in Example 2.

FIG. 15 is a configuration diagram schematically illustrating a general configuration of a computer system in Example 2. This configuration is similar to the configuration illustrated in FIG. 1; the difference is that the virtual storage apparatuses 200A-1 and 200B, and virtual components thereof (virtual ports, virtual LUs, and virtual LDEVs) have the same IDs as a physical storage apparatus 100A-1 in the system and the real components thereof.

In this example, the virtual storage apparatus has the same ID as at least one of the physical storage apparatuses 100 providing this virtual storage apparatus. The virtual storage apparatus provides a plurality of virtual ports and a plurality of virtual LDEVs, which have unique IDs within the virtual storage apparatus to which they belong. In other words, the IDs of virtual ports and virtual LDEVs may be duplicated between different virtual storage apparatuses.

Each virtual port provides one or more virtual LUs. The virtual LUs have unique IDs in the virtual port to which they belong. In other words, the IDs of virtual LUs may be duplicated among different virtual ports. The virtual port and the physical port, the virtual LDEV and the real LDEV, the virtual LU and the real LU each have one-to-one correspondence.

Between the virtual storage apparatuses 200A-1 and the physical storage apparatus 100A-1 in FIG. 15, the corresponding virtual port and physical port, the corresponding virtual LDEV and real LDEV, and the corresponding virtual LU and real LU have the same IDs.

Figure 16:
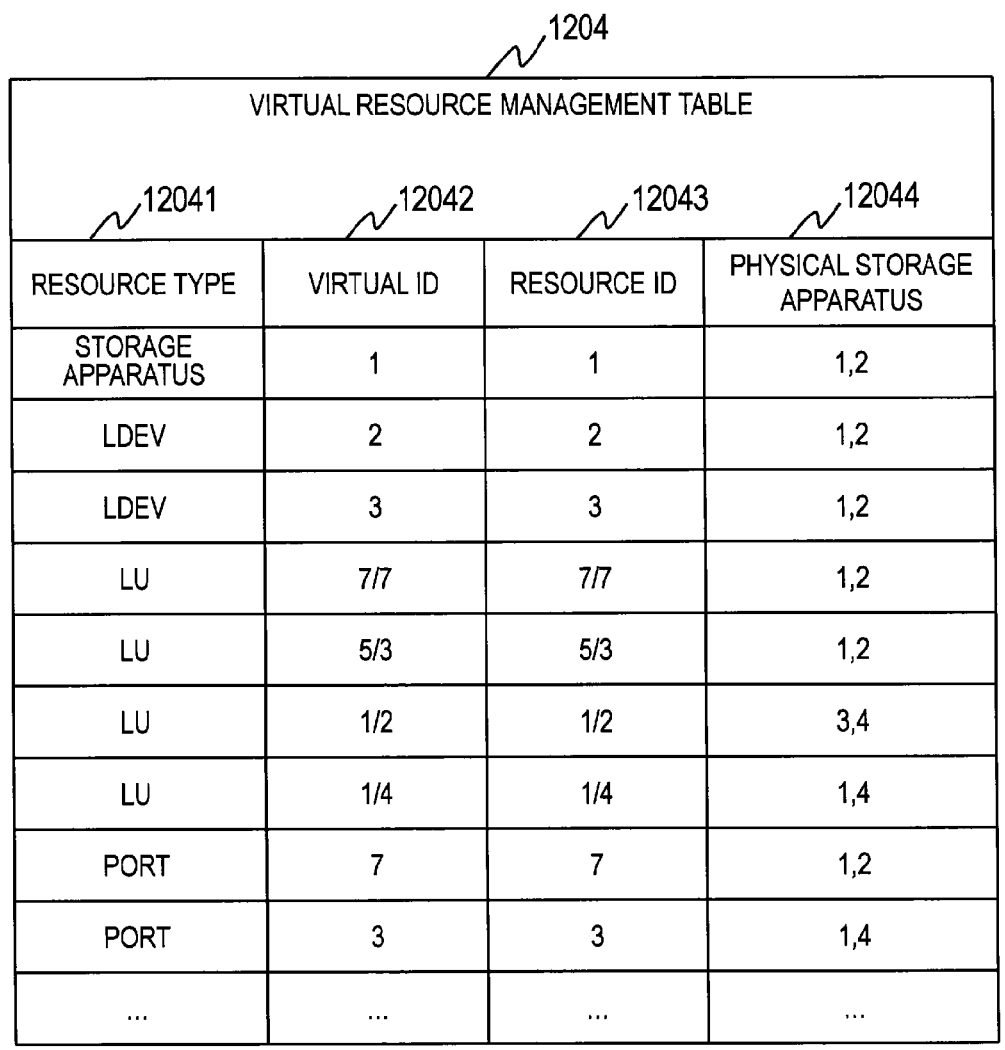
FIG. 16 illustrates an exemplary configuration of a virtual resource management table in Example 2.

The physical storage apparatus 100 configures the IDs of virtual resources (virtual storage apparatuses, virtual LDEVs, virtual ports, and virtual LUs) in such a manner that the above-described conditions are satisfied. FIG. 16 is a configuration diagram illustrating an example of the virtual resource management table 1204. This table has the same configuration as shown in FIG. 7 and the difference from Example 1 is that the values stored in the virtual ID column 12042 and the resource ID column 12043 are identical.

Figure 17:
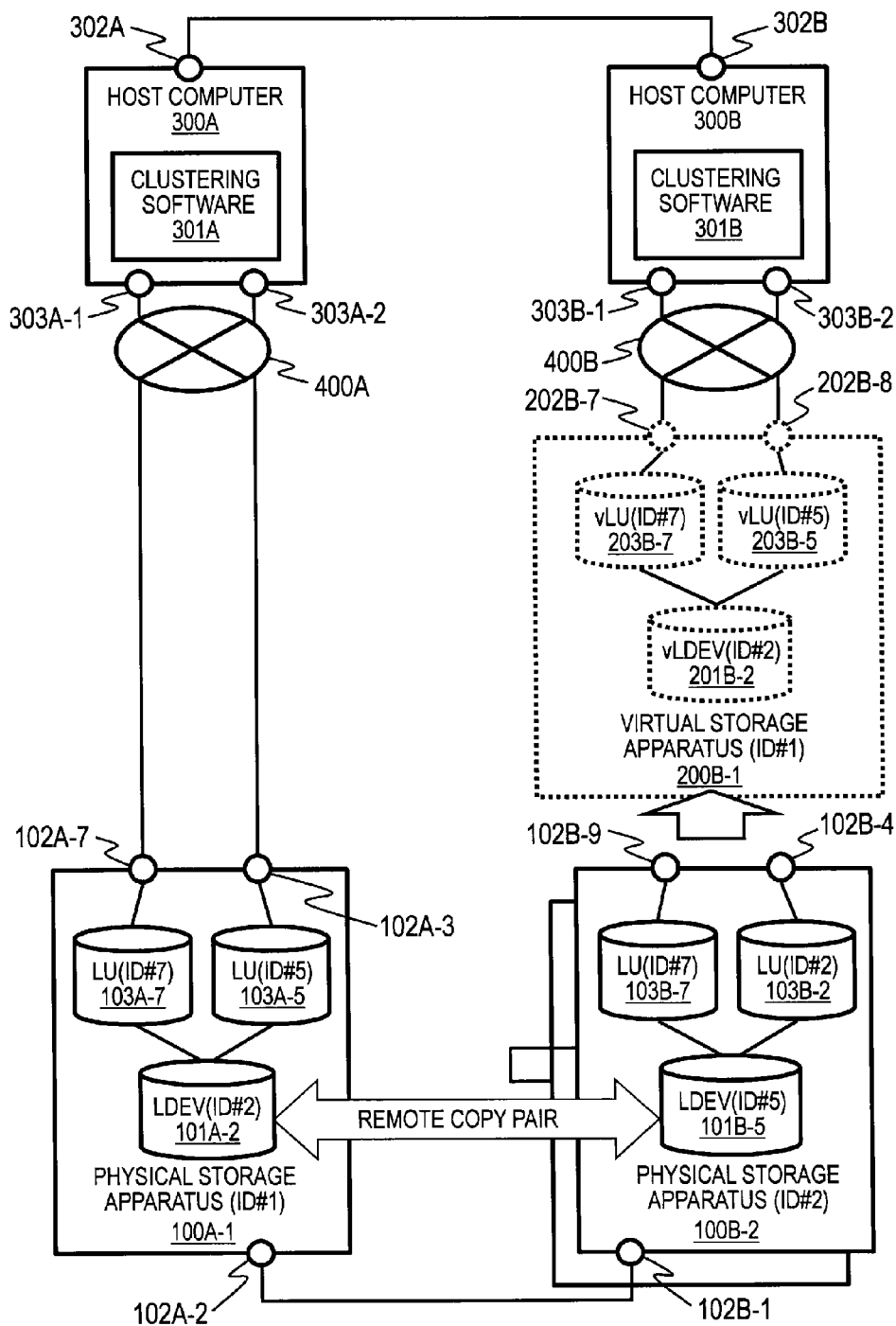
FIG. 17 schematically illustrates a configuration of a virtual storage apparatus that conceals remote copy configuration from host computers in Example 3.

The example of FIG. 15 has a configuration that the virtual storage apparatus and its components have the same IDs as a physical storage apparatus and its components. Like another example shown in FIG. 17, the system creates a virtual storage apparatus 200B-1 having the same ID as a physical storage apparatus 100A-1 at one site (group) and including components having the same IDs as those in the physical storage apparatus 100A-1 at the other site and does not need to create another virtual storage apparatus having the same ID as the virtual storage apparatus 200B-1 at the one site. The virtual storage apparatus 200B-1 is replicated from the physical storage apparatus 100A-1.

Example 3

Example 3 will be described hereinafter. In this example, methods of remote copy and data transfer caused by host I/O are different from those in Example 1. This example permits host accesses to the SVOL if the remote copy pair state is PAIR. On the other hand, if the pair state is PSUS, this example prohibits host accesses to the PVOL. It should be noted that Example 3 is derived from Example 1 and this description mainly explains the differences from Example 1. Example 3 can also be considered as a derivation from Example 2.

Figure 18A:
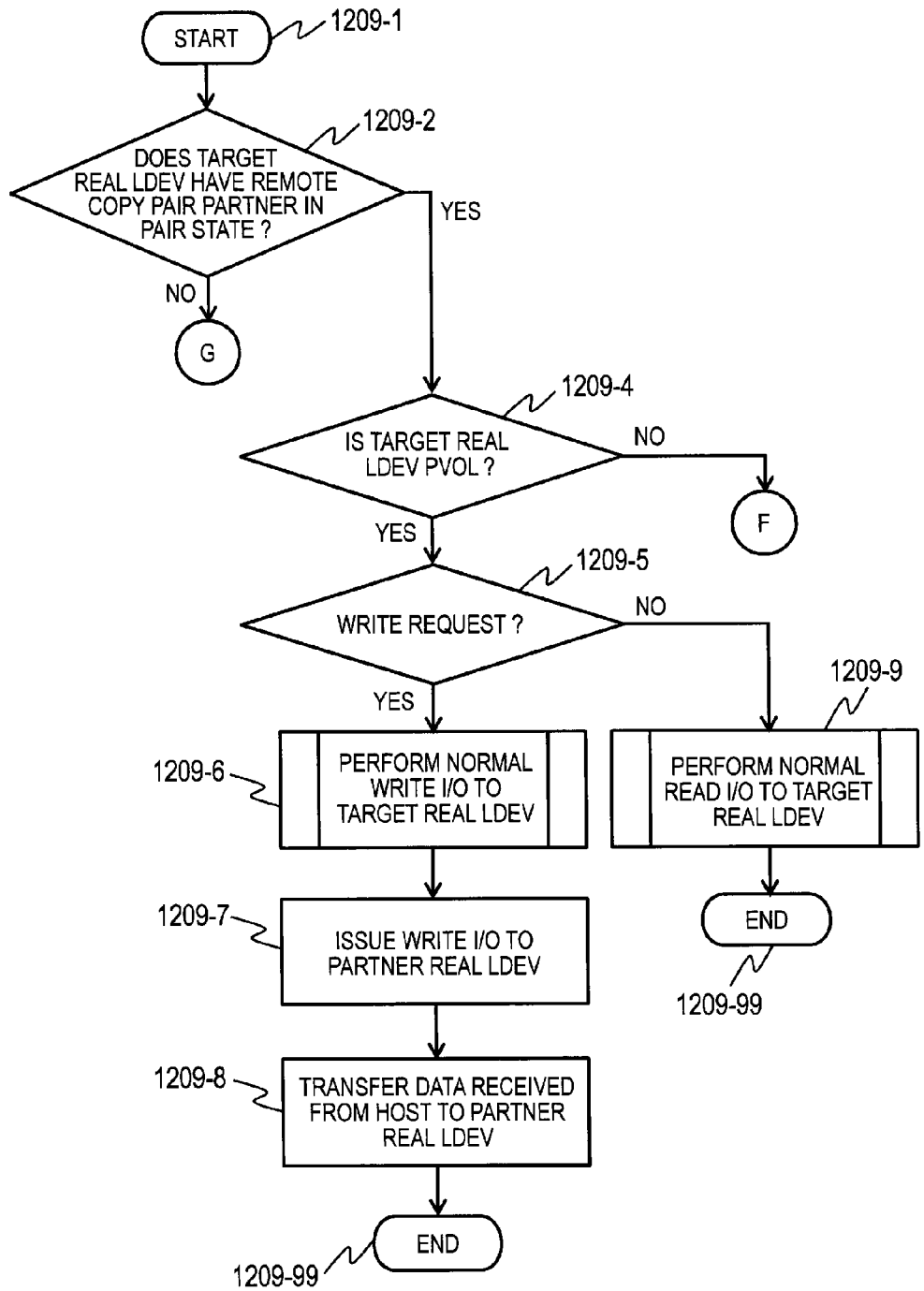
FIG. 18A is a flowchart of a remote copy control program in Example 3.
Figure 18B:
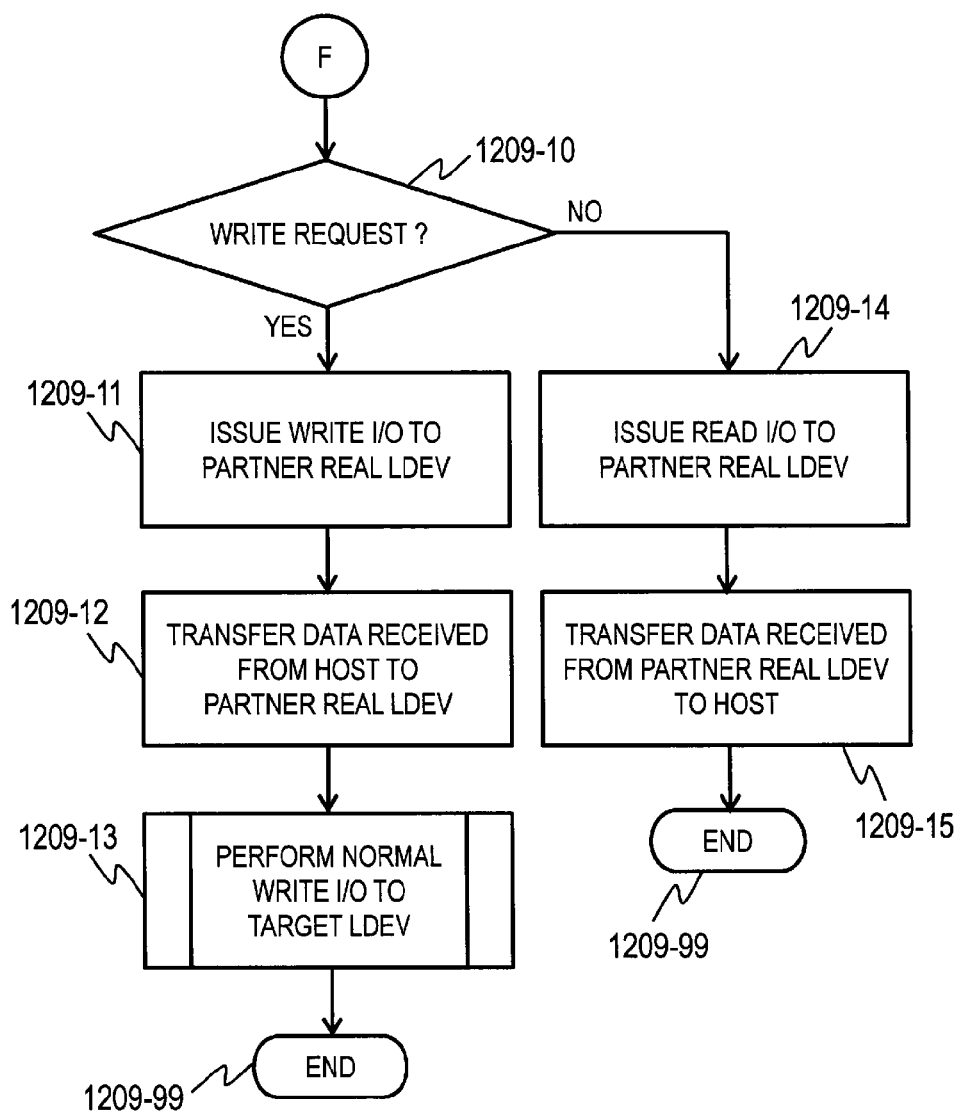
FIG. 18B is a flowchart of the remote copy control program in Example 3.
Figure 18C:
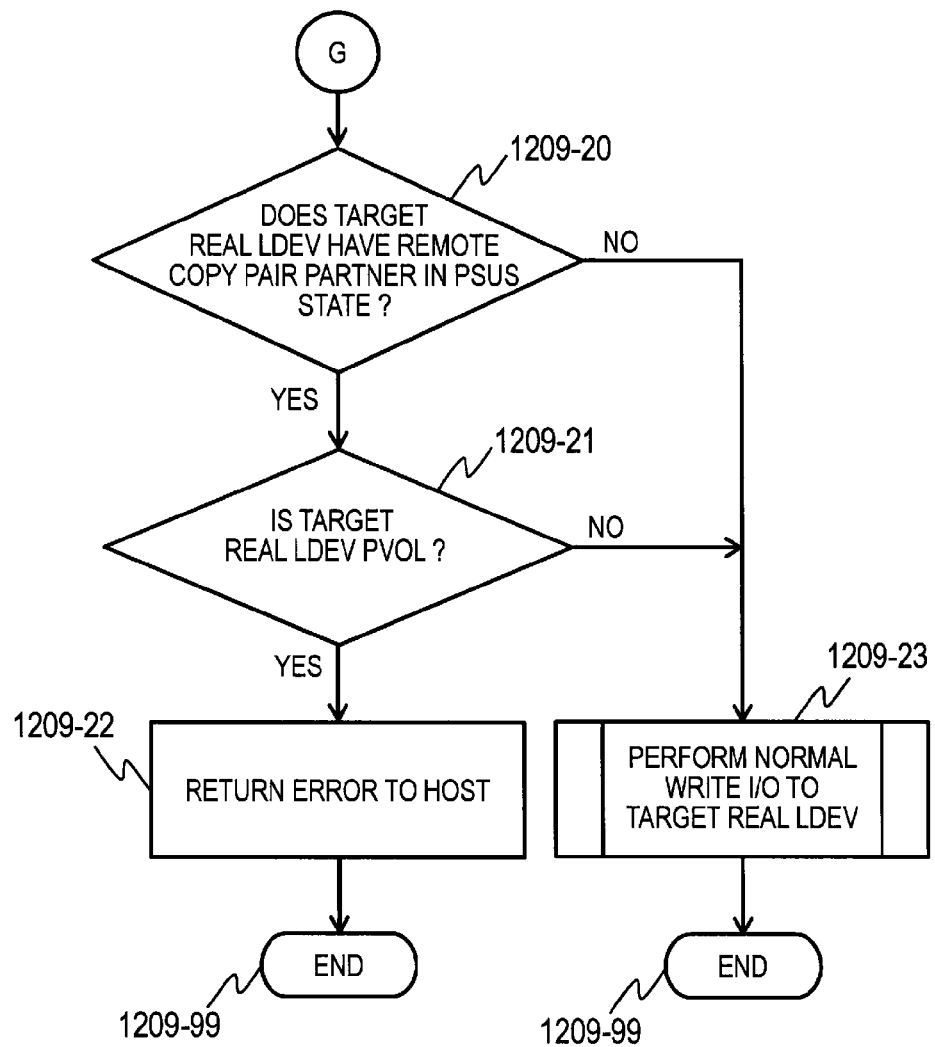
FIG. 18C is a flowchart of the remote copy control program in Example 3.

FIGS. 18A to 18C are flowcharts illustrating exemplary processing of a remote copy control program 1209. In place of the remote copy control program 1207 described in Example 1, the remote copy control program 1209 operates in this example.

The remote copy control program 1209 is started when the port controller 170 in the physical storage apparatus 100 receives a write request or a read request from the host computer 300 and notifies the processor 150 of it.

Upon start of the program (1209-1), the remote copy control program 1209 first checks whether the write target real LDEV 101 has a remote copy pair partner and the pair is in a PAIR state (1209-2). The write command includes an LU number, an address (LBA), and a block length of data.

To determine the real LDEV corresponding to the designated LU, the LDEV configuration management table 1201 may be referred to. The remote copy control program 1209 consults the remote copy management table 1206 for the determined real LDEV to check whether the real LDEV has a remote copy pair partner.

If the particular real LDEV 101 has configuration for a remote copy pair in a PAIR state (Yes at 1209-2), the remote copy control program 1207 determines whether to perform copy with reference to the pair state column 12064 and the LDEV attribute column 12065 in the remote copy management table 1206 (1209-4, 1209-5).

If the attribute of the real LDEV is PVOL (Yes at 1209-4) and the request from the host computer 300 is for a write (Yes at 1209-5), the remote copy control program 1209 stores the data in the target real LDEV (1209-6).

Thereafter, the remote copy control program 1209 copies the command received from the host computer 300 into the buffer of the port controller 170, rewrites the ID of the real LU to the ID of the real LU provided by the pair partner, and instructs the port controller to transfer the command to the physical storage apparatus to which the remote copy pair partner belongs (1209-7). After the transfer, the remote copy control program 1209 waits for a write completion report from the destination physical storage apparatus (1209-8) and ends (1209-99).

If the target real LDEV is a PVOL (Yes at 1209-4) and the request from the host is for a read (No at 1209-5), the remote copy control program 1209 retrieves data from the target real LDEV and transfers it to the host (1209-9), and ends (1209-99).

If the target real LDEV is in a PAIR state and is an SVOL (No at 1209-4) and the request from the host is for a write (Yes at 1209-10), the remote copy control program 1209 copies the command received from the host computer 300 to the buffer of the port controller 170.

The remote copy control program 1209 rewrites the ID of the real LU in the copied command to the ID of the real LU provided by the pair partner, and instructs the port controller to transfer the command to the physical storage apparatus to which the remote copy pair partner belongs (1209-11). After transferring the data to the partner real LDEV (1209-12), the remote copy control program 1209 stores the data to the target real LDEV (1209-13) and ends (1209-99).

If the target real LDEV is in a PAIR state and is an SVOL (No at 1209-4) and the request from the host 300 is a read command (No at 1209-10), the remote copy control program 1209 rewrites the ID of the real LU in the command received from the host computer 300 to the ID of the real LU provided by the pair partner, instructs the port controller to transfer the command to the physical storage apparatus to which the remote copy pair partner belongs (1209-14), transfers the received data of the pair partner real LDEV to the host computer (1209-15), and ends (1209-99).

If the target real LDEV is in a PSUS state and is a PVOL (No at 1209-2, Yes at 1209-20, and Yes at 1209-21), the remote copy control program 1209 rejects the command whichever the request of the host computer 300 is for a write and for a read (1209-22).

If the target real LDEV is in a PSUS state and is an SVOL (No at 1209-2, Yes at 1209-20, and No at 1209-21) or does not have a remote copy pair partner (No at 1209-2 and No at 1209-20), the remote copy control program 1209 performs normal I/O to the target real LDEV (1209-23) and ends (1209-99).

The above-described control enables operations in a site to be properly taken over by a physical storage apparatus and a host computer in a different site in the case where a failure occurs to either one or both of a physical storage apparatus and a host computer in the site.

As set forth above, embodiments of this invention have been described; however, this invention is not limited to the foregoing embodiments. Those skilled in the art can easily modify, add, or convert each element in the foregoing embodiments within the scope of this invention. A part of the configuration of some embodiment can be replaced with that of a different embodiment; otherwise, a configuration of an embodiment can be add to the configuration of a different embodiment.

For example, the above embodiments explain examples in which this invention has been applied to a storage system providing two kinds of real volumes of LDEVs and LUs; however, this invention is applicable to a storage system providing one kind of real volumes or a storage system in which volumes accessed by a host are configured from a storage pool.

The invention claimed is:
1. A storage system comprising:
a first physical storage apparatus providing a first real volume; and
a second physical storage apparatus providing a second real volume to form a copy pair with the first real volume,
wherein the first physical storage apparatus and the second physical storage apparatus reside on different networks respectively, the first physical storage apparatus provides a first host with a first storage identifier and a first virtual volume identifier for the first host to access the first real volume;
wherein the second physical storage apparatus provides a second host with at least a part of a first virtual storage apparatus including a first virtual volume assigned to the second real volume;
wherein the second physical storage apparatus assigns the first virtual volume identifier to the first virtual volume and the first storage identifier to the first virtual storage apparatus; and
wherein the second physical storage apparatus provides the second host with the first storage identifier and the first virtual volume identifier for the second host to access the second real volume via the first virtual volume.
2. A storage system according to claim 1,
wherein the second storage apparatus receives a request to create the first virtual storage apparatus as a replica for the first physical storage apparatus or a second virtual storage apparatus allocated the first real volume, which is an original storage apparatus for replication having the first storage identifier;

wherein the second physical storage apparatus identifies the second real volume forming a copy pair with the first real volume;

wherein the second physical storage apparatus acquires the first virtual volume identifier from the first physical storage apparatus;

wherein the second physical storage apparatus assigns the first storage identifier to the first virtual storage apparatus to register the first virtual storage apparatus; and wherein the second physical storage apparatus assigns the first volume identifier to the first virtual volume to register the first virtual volume.

3. A storage system according to claim 1, wherein the first physical storage apparatus provides the first host with a first port identifier for the first host to access the first real volume;

wherein the second physical storage apparatus provides the second host with a virtual port which a physical port is allocated and is included in the first virtual storage apparatus;

wherein the second physical storage apparatus assigns the first port identifier to the virtual port; and wherein the second physical storage apparatus provides the second host with the first port identifier for the second host to access the second real volume via the first virtual volume.

4. A storage system according to claim 1, wherein the first physical storage apparatus provides the first host with at least a part of a second virtual storage apparatus including a second virtual volume allocated the first real volume;

wherein the first physical storage apparatus assigns the first virtual volume identifier to the second virtual volume and the first storage identifier to the second virtual storage apparatus; and wherein the first physical storage apparatus provides the first host with the first storage identifier and the first virtual volume identifier for the first host to access the first real volume via the second virtual volume.

5. A storage system according to claim 4, wherein the first physical storage apparatus instructs, upon receipt of an instruction to add a virtual resource to the second virtual storage apparatus, the second physical storage apparatus to add a virtual resource having the same ID and of the same kind as the virtual resource to be added to the second virtual storage apparatus to the first virtual storage apparatus.

6. A storage system according to claim 4, wherein the first physical storage apparatus includes a first real logical device, a first real logical unit allocated the first real logical device, and a first physical port to which the first real logical unit belongs;

wherein the second physical storage apparatus includes a second real logical device, a second real logical unit allocated the second real logical device, and a second physical port to which the second real logical unit belongs;

wherein the first physical storage apparatus allocates the first physical port to a first virtual port of the second virtual storage apparatus;

wherein the second physical storage apparatus allocates the second physical port to a second virtual port of the first virtual storage apparatus;

wherein the first real volume is the first real logical device;

wherein the second real volume is the second real logical device;

wherein the first virtual volume is a first virtual logical unit allocated the second real logical unit;

wherein the second virtual volume is a second virtual logical unit allocated the first real logical unit;

wherein the first virtual volume identifier is identifiers of the first virtual logical unit and the second virtual logical unit;

wherein the first physical storage apparatus assigns a first port identifier to the first virtual port; and wherein the second physical storage apparatus assigns the first port identifier to the second virtual port.

7. A storage system according to claim 1, wherein the second physical storage apparatus receives a request to create the first virtual storage apparatus as a replica for the first physical storage apparatus or a second virtual storage apparatus allocated the first real volume, which is an original storage apparatus for replication having the first storage identifier; and wherein the second physical storage apparatus rejects the request in a case where a virtual storage apparatus having the first storage identifier has already been provided in a network with which the second physical storage apparatus connected.

8. A storage system according to claim 1, wherein the first real volume is a primary volume and the second real volume is a secondary volume;

wherein, in a copy pair state in which update of the primary volume is mirrored to the secondary volume synchronously or asynchronously, the second physical storage apparatus transmits, upon receipt of a request for write to the second real volume with write data from the second host, the request for write to the first real volume with the write data to the first physical storage apparatus, and thereafter writes the write data to the second real volume; and wherein, in the copy pair state, the second physical storage apparatus instructs, upon receipt of a request for read from the second real volume from the second host, the first physical storage apparatus to transfer read data designated by the read request and transfers the read data received from the first physical storage to the second host.

9. A method of controlling a storage system including a first physical storage apparatus providing a first real volume and a second physical storage apparatus providing a second real volume to form a copy pair with the first real volume, the method comprising:

providing, by the first physical storage apparatus, a first host with a first storage identifier and a first virtual volume identifier for the first host to access the first real volume;

providing, by the second physical storage apparatus, wherein the first storage apparatus and the second physical storage apparatus reside on different networks respectively, a second host with at least a part of a first virtual storage apparatus including a first virtual volume the second real volume is allocated;

assigning, by the second physical storage apparatus, the first virtual volume identifier to the first virtual volume and the first storage identifier to the first virtual storage apparatus; and providing, by the second physical storage apparatus, the second host with the first storage identifier and the first virtual volume identifier for the second host to access the second real volume via the first virtual volume.

10. A method of controlling a storage system according to claim 9, further comprising:
- receiving, by the second storage apparatus, a request to create the first virtual storage apparatus as a replica for the first physical storage apparatus or a second virtual storage apparatus allocated the first real volume, which is an original storage apparatus for replication having the first storage identifier;
- identifying, by the second physical storage apparatus, the second real volume forming a copy pair with the first real volume;
- acquiring, by the second physical storage apparatus, the first virtual volume identifier from the first physical storage apparatus;
- assigning, by the second physical storage apparatus, the first storage identifier to the first virtual storage apparatus to register the first virtual storage apparatus; and
- assigning, by the second physical storage apparatus, the first virtual volume identifier to the first virtual volume to register the first virtual volume.

11. A method of controlling a storage system according to claim 9, further comprising:
- providing, by the first physical storage apparatus, the first host with a first port identifier for the first host to access the first real volume;
- providing, by the second physical storage apparatus, the second host with a virtual port which a physical port is allocated and is included in the first virtual storage apparatus;
- assigning, by the second physical storage apparatus, the first port identifier to the virtual port; and
- providing, by the second physical storage apparatus, the second host with the first port identifier for the second host to access the second real volume via the first virtual volume.

12. A method of controlling a storage system according to claim 9, further comprising:
- providing, by the first physical storage apparatus, the first host with at least a part of a second virtual storage apparatus, inclusive of a second virtual volume allocated the first real volume;
- assigning, by the first physical storage apparatus, the first virtual volume identifier to the second virtual volume and the first storage identifier to the second virtual storage apparatus; and
- providing, by the first physical storage apparatus, the first host with the first storage identifier and the first virtual volume identifier for the first host to access the first real volume via the second virtual volume.

13. A method of controlling a storage system according to claim 12, further comprising:
- instructing, by the first physical storage apparatus, upon receipt of an instruction to add a virtual resource to the second virtual storage apparatus, the second physical storage apparatus to add a virtual resource having the same ID and of the same kind as the virtual resource to be added to the second virtual storage apparatus to the first virtual storage apparatus.

14. A method of controlling a storage system according to claim 12,
- wherein the first physical storage apparatus includes a first real logical device, a first real logical unit allocated the first real logical device, and a first physical port to which the first real logical unit belongs;
- wherein the second physical storage apparatus includes a second real logical device, a second real logical unit allocated the second real logical device, and a second physical port to which the second real logical unit belongs;
- wherein the first real volume is the first real logical device;
- wherein the second real volume is the second real logical device;
- wherein the first virtual volume is a first virtual logical unit allocated the second real logical unit;
- wherein the second virtual volume is a second virtual logical unit allocated the first real logical unit;
- wherein the first virtual volume identifier is identifiers of the first virtual logical unit and the second virtual logical unit; and
- wherein the method further comprises:
- allocating, by the first physical storage apparatus, the first physical port to a first virtual port of the second virtual storage apparatus;
- allocating, by the second physical storage apparatus, the second physical port to a second virtual port of the first virtual storage apparatus;
- assigning, by the first physical storage apparatus, a first port identifier to the first virtual port; and
- assigning, by the second physical storage apparatus, the first port identifier to the second virtual port.

15. A method of controlling a storage system according to claim 9,
- wherein the first real volume is a primary volume and the second real volume is a secondary volume; and
- wherein, in a copy pair state in which update of the primary volume is mirrored to the secondary volume synchronously or asynchronously, the method further comprises:
- transmitting, by the second physical storage apparatus, upon receipt of a request for write to the second real volume with write data from the second host, the request for write to the first real volume with the write data to the first physical storage apparatus, and thereafter writing the write data to the second real volume; and
- instructing, by the second physical storage apparatus, upon receipt of a request for read from the second real volume from the second host, the first physical storage apparatus to transfer read data designated by the read request and transferring the read data received from the first physical storage to the second host.

* * * * *